(12) United States Patent
Matsuoka et al.

(10) Patent No.: US 10,067,537 B2
(45) Date of Patent: *Sep. 4, 2018

(54) ELECTRONIC DEVICE HOUSING AND ASSEMBLY METHOD

(71) Applicant: Google LLC, Mountain View, CA (US)

(72) Inventors: Yoshimichi Matsuoka, Sunnyvale, CA (US); Michael James Louris, San Jose, CA (US); Jeffrey Hayashida, San Francisco, CA (US); Jack Wanderman, Minnetonka, MN (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,440

(22) Filed: Mar. 2, 2015

(65) Prior Publication Data
US 2015/0169007 A1 Jun. 18, 2015

Related U.S. Application Data

(63) Continuation of application No. 13/799,282, filed on Mar. 13, 2013, now Pat. No. 8,995,125.
(Continued)

(51) Int. Cl.
*G06F 1/16* (2006.01)
*B29C 45/44* (2006.01)

(52) U.S. Cl.
CPC .......... *G06F 1/1658* (2013.01); *B29C 45/44* (2013.01); *G06F 1/1616* (2013.01); *Y10T 29/49002* (2015.01)

(58) Field of Classification Search
CPC .... G06F 1/1616; G06F 1/1656; G06F 1/1662; G06F 3/02
(Continued)

(56) References Cited

U.S. PATENT DOCUMENTS 5,196,993 A    3/1993   Herron et al.
5,278,730 A *   1/1994   Kikinis ................ G06F 1/1626
                                                                 361/679.32
(Continued)

FOREIGN PATENT DOCUMENTS

CN       201889363 U    7/2011
EP        2447766 A1    5/2012
(Continued)

OTHER PUBLICATIONS

Examiner's Report dated May 25, 2016, for Canadian Patent Application No. 2,879,309.
(Continued)

*Primary Examiner* — Adrian S Wilson
(74) *Attorney, Agent, or Firm* — Lerner, David, Littenberg, Krumholz & Mentlik, LLP

(57) ABSTRACT

An electronic device includes a first housing of a single piece of material that has first and second spaced apart major walls that extend in lateral directions and at least three side walls extending perpendicular to the lateral directions between the major walls. The major walls and the side walls define an internal cavity, and the first housing defines an opening to the internal cavity opposite one of the side walls. At least one support member is within the internal cavity of the first housing adjacent a major walls a side wall thereof. At least one electronic component is contained within the internal cavity, and a first cover is removably affixed over the opening. At least one of the support member and the first cover contributes to a retention force applied on the at least one electronic component within the internal cavity of the first housing.

19 Claims, 13 Drawing Sheets

Related U.S. Application Data

(60) Provisional application No. 61/680,824, filed on Aug. 8, 2012.

(58) Field of Classification Search
USPC .................... 361/679.08, 679.09, 679.17
See application file for complete search history.

(56) References Cited

U.S. PATENT DOCUMENTS

| | | | |
|---|---|---|---|
| 5,332,306 A * | 7/1994 | Babb .................... | H05K 7/1405 312/223.1 |
| 5,510,953 A | 4/1996 | Merkel | |
| 5,546,334 A | 8/1996 | Hsieh et al. | |
| 5,560,572 A * | 10/1996 | Osborn .................... | G12B 9/00 248/201 |
| 5,574,625 A | 11/1996 | Ohgami et al. | |
| 5,576,929 A | 11/1996 | Uchiyama et al. | |
| 5,608,611 A | 3/1997 | Szudarek et al. | |
| 5,682,291 A * | 10/1997 | Jeffries .................... | G06F 1/184 312/223.2 |
| 5,715,139 A | 2/1998 | Nakajima | |
| 6,064,564 A | 5/2000 | Song et al. | |
| 6,075,694 A * | 6/2000 | Mills .................... | G06F 1/187 312/223.2 |
| 6,111,746 A | 8/2000 | Wahl et al. | |
| 6,115,242 A * | 9/2000 | Lambrecht .............. | G06F 1/183 257/686 |
| 6,198,626 B1 | 3/2001 | Nakajima et al. | |
| 6,459,591 B2 | 10/2002 | Liu | |
| 6,480,397 B1 | 11/2002 | Hsu et al. | |
| 6,560,119 B1 | 5/2003 | Katsuyama et al. | |
| 6,574,096 B1 | 6/2003 | Difonzo et al. | |
| 6,595,786 B2 | 7/2003 | Horiuchi et al. | |
| 6,842,332 B1 * | 1/2005 | Rubenson .............. | G06F 1/1616 361/679.09 |
| 7,075,785 B2 | 7/2006 | Minaguchi et al. | |
| 7,136,279 B2 | 11/2006 | Yu et al. | |
| 7,265,969 B2 | 9/2007 | Jin | |
| 7,382,612 B2 | 6/2008 | Chan et al. | |
| 7,612,997 B1 | 11/2009 | Diebel et al. | |
| 7,672,120 B2 * | 3/2010 | Kohlman .............. | G06F 1/1616 312/223.1 |
| 7,719,826 B1 * | 5/2010 | Chang .................... | G06F 1/1616 312/223.2 |
| 7,929,283 B2 * | 4/2011 | Wang .................... | G06F 1/1616 361/679.17 |
| 7,930,011 B2 | 4/2011 | Shi et al. | |
| 8,050,020 B2 | 11/2011 | Liu | |
| 8,286,789 B2 | 10/2012 | Wilson et al. | |
| 8,687,359 B2 | 4/2014 | Theobald et al. | |
| 8,821,678 B1 * | 9/2014 | Yu .................... | G06F 1/1616 156/308.2 |
| 8,861,191 B1 * | 10/2014 | Yu .................... | G06F 1/1601 361/679.06 |
| 8,971,026 B2 * | 3/2015 | Matsuoka .............. | H05K 5/03 16/348 |
| 8,995,125 B2 * | 3/2015 | Matsuoka .............. | G06F 1/1658 361/679.55 |
| 2001/0015005 A1 | 8/2001 | Chung et al. | |
| 2002/0006031 A1 | 1/2002 | Liu | |
| 2002/0061736 A1 | 5/2002 | Boman et al. | |
| 2002/0085338 A1 | 7/2002 | Lin | |
| 2003/0021082 A1 | 1/2003 | Lu et al. | |
| 2003/0100275 A1 | 5/2003 | Hsu et al. | |
| 2004/0001307 A1 * | 1/2004 | Takakusaki .......... | G06F 1/1616 361/679.17 |
| 2004/0012509 A1 * | 1/2004 | Chen .................... | G06F 1/1616 341/22 |
| 2004/0134253 A1 | 7/2004 | Kim | |
| 2004/0160738 A1 | 8/2004 | Chen et al. | |
| 2004/0246669 A1 | 12/2004 | Minaguchi et al. | |
| 2005/0018391 A1 * | 1/2005 | Jin .................... | G06F 1/1616 361/679.4 |
| 2005/0023022 A1 | 2/2005 | Kriege et al. | |
| 2006/0099837 A1 | 5/2006 | Cheng et al. | |
| 2006/0176659 A1 | 8/2006 | Sun et al. | |
| 2006/0227502 A1 * | 10/2006 | Cheng .................... | G06F 1/187 361/679.39 |
| 2006/0268502 A1 | 11/2006 | Liu et al. | |
| 2006/0268528 A1 | 11/2006 | Zadesky et al. | |
| 2007/0020981 A1 | 1/2007 | Matsuo | |
| 2007/0025072 A1 | 2/2007 | Liao | |
| 2007/0081318 A1 | 4/2007 | Lynch et al. | |
| 2007/0127204 A1 * | 6/2007 | Muenzer ................ | G06F 1/181 361/679.58 |
| 2007/0230101 A1 | 10/2007 | Wong et al. | |
| 2008/0019085 A1 | 1/2008 | Nakajima | |
| 2008/0037771 A1 | 2/2008 | Black et al. | |
| 2008/0259537 A1 | 10/2008 | Arisaka et al. | |
| 2008/0259540 A1 | 10/2008 | Takayanagi et al. | |
| 2008/0265024 A1 | 10/2008 | Tracy et al. | |
| 2008/0304214 A1 | 12/2008 | Nakajima | |
| 2009/0040703 A1 | 2/2009 | Gotham et al. | |
| 2009/0059493 A1 * | 3/2009 | Iwamoto .............. | G06F 1/1616 361/679.09 |
| 2009/0091879 A1 | 4/2009 | Lim | |
| 2010/0014237 A1 | 1/2010 | Takizawa | |
| 2010/0039761 A1 | 2/2010 | Wang | |
| 2010/0091442 A1 | 4/2010 | Theobald et al. | |
| 2010/0277858 A1 | 11/2010 | Zhou | |
| 2011/0051360 A1 | 3/2011 | Dabov et al. | |
| 2011/0085286 A1 | 4/2011 | Tanaka et al. | |
| 2011/0211306 A1 | 9/2011 | Murakami et al. | |
| 2011/0222238 A1 | 9/2011 | Staats et al. | |
| 2012/0030930 A1 | 2/2012 | Theobald et al. | |
| 2012/0036322 A1 * | 2/2012 | Klein .................... | G06F 1/187 711/114 |
| 2012/0050975 A1 | 3/2012 | Garelli et al. | |
| 2012/0092821 A1 | 4/2012 | Raff et al. | |
| 2012/0099264 A1 | 4/2012 | Degner et al. | |
| 2012/0120562 A1 | 5/2012 | Prest et al. | |
| 2014/0016257 A1 * | 1/2014 | Matsuoka ............ | H05K 5/03 361/679.26 |
| 2014/0043744 A1 | 2/2014 | Matsuoka et al. | |
| 2015/0092332 A1 * | 4/2015 | Yu .................... | G06F 1/1601 361/679.09 |
| 2015/0153769 A1 * | 6/2015 | Matsuoka ............ | H05K 5/03 29/592.1 |

FOREIGN PATENT DOCUMENTS

| | | |
|---|---|---|
| JP | H07-076023 A | 3/1995 |
| JP | H07-200121 A | 8/1995 |
| JP | H08-090211 | 4/1996 |
| JP | 08264980 | 10/1996 |
| JP | H11-348072 A | 12/1999 |
| JP | 2000188491 A | 7/2000 |
| JP | 2000257313 A | 9/2000 |
| JP | 2002045956 A | 2/2002 |
| JP | 2002221925 A | 8/2002 |
| JP | 2002263820 A | 9/2002 |
| JP | 2004241091 A | 8/2004 |
| JP | 2005346185 A | 12/2005 |
| JP | 2009080800 A | 4/2009 |
| JP | 2009296026 A | 12/2009 |
| JP | 2012505482 A | 3/2012 |
| JP | 2012119666 A | 6/2012 |
| JP | 2013508818 A | 3/2013 |
| KR | 20110076951 A | 7/2011 |
| TW | 488610 U | 5/2002 |
| WO | 2010039132 A1 | 4/2010 |
| WO | 2010045161 A1 | 4/2010 |

OTHER PUBLICATIONS

Pre-Appeal Re-Examination Report for Japanese Patent Application No. 2015-526541 dated May 30, 2016.
Pre-Appeal Re-Examination Report for Japanese Patent Application No. 2015-523143 dated May 27, 2016.

(56) References Cited

OTHER PUBLICATIONS

Notification of the Second Office Action dated Jul. 5, 2016, for Chinese Patent Application No. 201380043110.X.
Notice of Office Action dated Aug. 18, 2016, for Korean Patent Application No. 10-2015-7020518.
International Search Report and Written Opinion for Application No. PCT/US2013/050262 dated Oct. 24, 2013.
International Search Report and Written Opinion for Application No. PCT/US2013/050243 dated Jan. 7, 2014.
Korean Office Action for Application No. KR 10-2015-7004192 dated Mar. 16, 2015.
Korean Office Action for Application No. 10-2015-7005993 dated May 6, 2015.
Japanese Office Action for Application No. 2015-526541 dated Jul. 7, 2015.
Notification of First Office Action for Chinese Patent Application No. 201380051295.9, dated Nov. 4, 2015.
Extended European Search Report for Application No. 13819498.0 dated May 28, 2015.
Office Action for Korean Patent Application No. 10-2015-7015941 dated Apr. 21, 2016.
Office Action for European Patent Application No. 13819498.0 dated Apr. 12, 2016.
Notification of First Office Action for Chinese Patent Application No. 201380043110.X, dated Nov. 23, 2015.
Extended European Search Report for EP Patent Application No. 13827899.9, dated Dec. 21, 2015.
Notice of Grant for Japanese Pantent Application No. 2015-526541, dated Mar. 21, 2017. 18 pages.
Notice of Grounds of Rejection for Japanese Patent Application No. 2015-523143, dated Nov. 22, 2016.
Examination Report for European Patent Application No. 13827899.9, dated Dec. 2, 2016.
Office Action for Korean Patent Application No. 10-2015-7020518, dated Apr. 27, 2017.
Notice of Grant for Japanese Patent Application No. 2017-014130 dated Dec. 12, 2017. 3 pages.

* cited by examiner

ELECTRONIC DEVICE HOUSING AND ASSEMBLY METHOD

CROSS-REFERENCE TO RELATED APPLICATIONS

The present application is a continuation of U.S. patent application Ser. No. 13/799,282, filed Mar. 13, 2013 which claims the benefit of the filing date of U.S. Provisional Application No. 61/680,824 filed Aug. 8, 2012, the disclosure of which is incorporated by reference herein.

BACKGROUND

Housings for portable notebook or clamshell-style computers can be made from a number of plastic panels or sections that are assembled onto a metal frame. The metal frame is structured to retain and attach together the computer's internal components. Such internal components can include a printed circuit board that carries the computer's central processor and any additional processors such as for graphics or the like as well as the computer's random-access memory (RAM). Additional components include batteries, input devices such as a keyboard and trackpad or the like, storage memory (such as a hard drive, solid-state drive, or the like, communications devices (such as for WiFi connection and networking), removable memory devices (such as CD- or DVD-R/W drives), and structures for external peripheral connections.

In such frame-based housing structures, all components can be affixed to the frame, which itself can be made up of several different parts. The components of the housing are in turn attached to the frame to provide a somewhat uniform external appearance and to provide protection for the internal components. In a notebook (or clamshell) configuration, the arrangement just described can make up a base unit that is configured to rest on a surface. Another assembly in the form of a lid, or display, housing can be attached to the base housing by a hinge. The lid housing can include a video display, which can be in the form of a LCD panel with various forms of backlighting associated therewith. Similar to the base housing, the display (and any other components also included within the lid housing) can be affixed to another frame to which other housing sections or panels are affixed to enclose the lid assembly. The hinge can be attached to both the frame of the lid and the frame of the base with portions thereof extending through openings between or within the housing sections or panels.

The hinged attachment between the base and lid housings can allow the computer to be moved between open and closed configurations. The closed configuration being such that the lid is positioned against the base with the display and input devices positioned internally of the housing units for protection thereof during transportation. In the open configuration, the display is viewable and the input devices are accessible to the user. The lid can be rotated through a range of positions to provide for comfortable viewing of the display.

Such housing configurations can be complicated to assemble and to disassemble for repair or maintenance reasons due to the complicated nature of attaching multiple housing components to the frame. Further, they can be bulky due to the number of components and the complex assembly patterns required. Further, the number of joints or connections between components can provide a number of potential failure areas that can reduce the overall strength and protection provided by such housings.

While many notebook computers still use such a housing structure, other structures have been developed that seek to combine the utility of the frame into a part of the housing units and to reduce the overall number of exterior pieces that make up the housing. Such structures can be made from metal and can, for example include in one unit the top wall of a base housing (that surrounds the keyboard) along with the front and side walls thereof. This unit can also have internal reinforcement and can include attachment structures (such as threaded holes) for attachment of the internal components). A separate unit can define the bottom wall of the base and can attach to the upper housing unit. Such structures can provide for easier assembly of components but can still include major failure locations along the large attachment areas between housing components.

BRIEF SUMMARY

An aspect of the present disclosure relates to an electronic device including a first housing of a single piece of material. The first housing includes first and second spaced apart major walls that extend in lateral directions and at least three side walls extending perpendicular to the lateral directions between the major walls. The major walls and the side walls define an internal cavity, and the first housing defines an opening to the internal cavity opposite one of the side walls. The device further includes at least one support member within the internal cavity of the first housing adjacent at least one of the major walls or one of the side walls thereof. At least one electronic component is contained within the internal cavity of the first housing, and a first cover is removably affixed over the opening of the first housing. At least one of the support member and the first cover contributes to a retention force applied on the at least one electronic component within the internal cavity of the first housing.

The support member can be a portion of the single piece of material of the first housing. Further, the support member can extend along an interior of one of the first and second major walls and away from at least one of the side walls. The support member can further be in the form of a rib configured to provide structural support at least for the one of the first and second major walls that it extends along. In one example, the support member can extend along interiors of both the first and second major walls. In addition, the electronic component can include a slot configured to receive the rib of the support member therein such that the rib contributes to the retention force on the electronic component.

The support member can include a boss extending from at least one of the major walls or the side walls. Such a boss can include a threaded hole, and the electronic component can further include a through hole aligned with the threaded hole. In such an example, the device can further include a screw that passes through the through hole and engages with the threaded hole such that the boss contributes to the retention force on the electronic component. A fixation element can be affixed between the electronic component and the boss such that the boss contributes to the retention force on the electronic component.

In another example, the support member can be a frame element affixed within the internal cavity of the housing. The frame element can be affixed along an interior of at least one of the major walls or one of the side walls. Additionally or alternatively, at least a portion of the frame element can be configured to extend between an interior of the first major wall and an interior of the second major wall. In a further example, the frame element can include a rib that extends in a direction away from an adjacent side wall along at least one of the first or second major walls. The electronic component can include a slot configured to receive the rib of the frame element therein such that the rib contributes to the retention force on the electronic component. The frame element can include a threaded hole, and the electronic component can further include a through hole aligned with the threaded hole. Accordingly, the device can further include a screw that passes through the through hole and engages with the threaded hole such that the frame element contributes to the retention force on the electronic component.

The frame element can be configured to add rigidity to the housing by assembly therewith. Further, the frame element can be a portion of a frame assembly that includes a plurality of frame elements configured for assembly together within the first housing.

The electronic component can include an attachment feature aligned with the support member, and the device can further include an attachment member connecting the electronic component with the support member by the attachment feature to contribute to the retention force. In such an example, the housing can include a second opening through one of the major walls or side walls that is aligned with the attachment feature. A second cover can be affixed to the first housing over the second opening thereof. Such a cover can include at least one raised feature thereon configured for supporting the housing on a surface. The cover can be configured as a portion of a keyboard assembly removably attached within the opening.

The first housing can be a base housing for a base assembly of a portable computer, and the first cover can be a first portion of a hinge assembly. In such an example, the electronic device can further include a lid assembly operatively connected to the base housing by the hinge assembly. The first opening can extend along a portion of one of the major surfaces, and the first portion of the hinge assembly can be of a heat conducting material and extends within the opening portion within the major surface. Further, the electronic component can be positioned adjacent the first portion of the hinge assembly such that heat emitted from the electronic component can be transferred to the first portion of the hinge assembly.

The first major walls of the first housing can include a second opening therein, and the device can further include a keyboard assembly having a plurality of keys with the keyboard assembly being removably received within the second opening. The keyboard assembly can be configured to be removably attached within the opening by a snap-fit arrangement. In another example, the keyboard assembly can define a first inclined surface, and the device can include a second electronic component that defines a second inclined surface. The first and second inclined surfaces can be configured to contact each other when the keyboard assembly is received within the second opening and such that the keyboard assembly exerts a force on the second electronic component toward one of the side walls.

In another example, the electronic component can be an assembly of a printed circuit board and one or more support units configured to contact at least two of the side walls of the housing within the internal cavity. The one or more support units can be assembled with the printed circuit board to retain the printed circuit board within the housing and spaced apart from the side walls.

The support member can be one of a plurality of support members, and the electronic component can be one of a plurality of electronic components within the housing. At least some of such electronic components can be engaged with respective ones of at least some of the support members.

Another aspect of the present disclosure relates to an electronic housing assembly including a first housing unit including first and second spaced apart major walls that extend in lateral directions and at least three side walls extending perpendicular to the lateral directions between the major walls. The major walls and the side walls define an internal cavity, and the first housing unit defines an opening to the internal cavity opposite one of the side walls. The device further includes at least one support member within the internal cavity of the first housing unit adjacent at least one of the major walls or side walls thereof. At least one electronic component is contained within the internal cavity of the first housing unit, and a first cover is removably affixed over the opening of the first housing. The first housing unit is made by a process including injection molding the first housing unit of a single piece of material with the side walls solidly joined to the first and second major walls and adjacent ones of the side walls solidly joined together within the single piece of material.

The assembly can further include at least one electronic component received within the first housing unit. In such an example, the process of making the first housing unit can further include injection molding the single piece of material into a form configured to receive the at least one electronic component therein.

The process including injection molding can be carried out such that the at least one support member is formed thereby and is solidly joined with an adjacent one of the side walls or the major walls. Additionally or alternatively, the injection molding can be carried out using a mold that imparts an outside form of the first housing unit on a molten plastic material injected thereinto, the form including respective outside surfaces of the side walls of the first housing unit. The injection molding can also be carried out using a core that imparts an inside form of the first housing unit on the molten plastic material, the inside form including respective inside surfaces of the side walls that define the internal cavity. The core can include two side portions and a central portion, and the core can be configured to collapse by movement of the central portion in a first lateral direction through the first opening that causes corresponding inward movement of the side portions in a second lateral direction perpendicular to the first lateral direction. The inside form of the first housing unit can further include the at least one support member extending from at least one of the side walls in the second direction away therefrom, and a corresponding one of the side units of the core can be configured to impart a portion of the inside form including the at least one support member.

Another aspect of the present disclosure relates to a method for assembling an electronic device. The device includes inserting an electronic component into a first housing through a first opening thereof. The first housing includes first and second spaced apart major walls that extend in lateral directions and at least three side walls extending perpendicular to the lateral directions between the major walls. The major walls and the side walls define an internal cavity, and the first housing defines the first opening to the internal cavity opposite one of the side walls. At least one support member is within the internal cavity of the first housing adjacent at least one of the major walls or side walls thereof. The method also includes engaging the electronic component with the at least one support member, and removably affixing a cover over the opening of the first housing. At least one of the cover and the at least one support member contributes to a retaining force applied on the electronic component within the first housing.

The cover can be a first portion of a hinge assembly and the first housing can be a base housing for a base assembly of a portable computer. In such an example, the method can further include attaching a lid assembly having a display screen with a second portion of the hinge assembly, the hinge assembly being configured for operatively connecting the lid assembly to the base assembly.

In a further example, the first housing can be a base housing for a base assembly of a notebook computer and can have a second opening through one of the major walls. In such an example, the method can further include inserting a trackpad assembly into the first housing. The trackpad assembly can have a touch-sensitive surface, and the method can further include moving the trackpad into a position within the base housing such that the touch-sensitive surface is exposed in the second opening and is substantially flush with an outside surface of the side major wall in which the second opening is formed.

The method can further include inserting a plurality of electronic components into the first housing through the open end thereof such that at least some of the electronic components are in mutually contacting relationships among each other within the housing. In such an example, at least one electronic component can contact the cover, and another electronic component can contact a side wall opposite the cover. The mutually contacting relationships among the electronic components can, accordingly, be such that a combination of electronic components spans a length between the cover and one of the side walls that is opposite the cover.

In an example, the method can include forming the first housing from a single piece of material by injection molding. The injection molding can be carried out using a mold that imparts an outside form of the first housing unit on a molten plastic material injected thereinto. The outside form can include respective outside surfaces of the side walls of the first housing unit. The injection molding can also use a core that imparts an inside form of the first housing unit on the molten plastic material. The inside form can include respective inside surfaces of the side walls that define the internal cavity.

Another aspect of the present disclosure can relate to a method for making an electronic device housing. The method can include injection molding a first housing unit of a single piece of material. The first housing unit includes first and second spaced apart major walls that extend in lateral directions and at least three side walls extending perpendicular to the lateral directions between the major walls. The side walls are solidly joined to the first and second major walls, and adjacent ones of the side walls are solidly joined together within the single piece of material. The major walls and the side walls define an internal cavity, and the first housing unit defines an opening to the internal cavity opposite one of the side walls. The method further includes removably affixing a first cover over the opening of the first housing unit.

The method can further include positioning at least one electronic component within the first housing unit, and the step of injection molding can be such that the first housing unit is in a form configured to receive the at least one electronic component therein. The injection molding can be carried out such that the first housing unit includes at least one support member formed thereby that is solidly joined with an adjacent one of the side walls or the major walls.

The injection molding can be carried out using a mold that imparts an outside form of the first housing unit on a molten plastic material injected thereinto. The outside form can include respective outside surfaces of the side walls of the first housing unit. The injection molding can also use a core that imparts an inside form of the first housing unit on the molten plastic material. The inside form can include respective inside surfaces of the side walls that define the internal cavity. The core can include two side portions and a central portion with the core being configured to collapse by movement of the central portion in a first lateral direction through the first opening that causes corresponding inward movement of the side portions in a second lateral direction perpendicular to the first lateral direction. In such an example, the inside form of the first housing unit can further include at least one support member extending from at least one of the side walls in the second direction away therefrom, and a corresponding one of the side units of the core can be configured to impart a portion of the inside form including the at least one support member.

DETAILED DESCRIPTION

Figure 1:
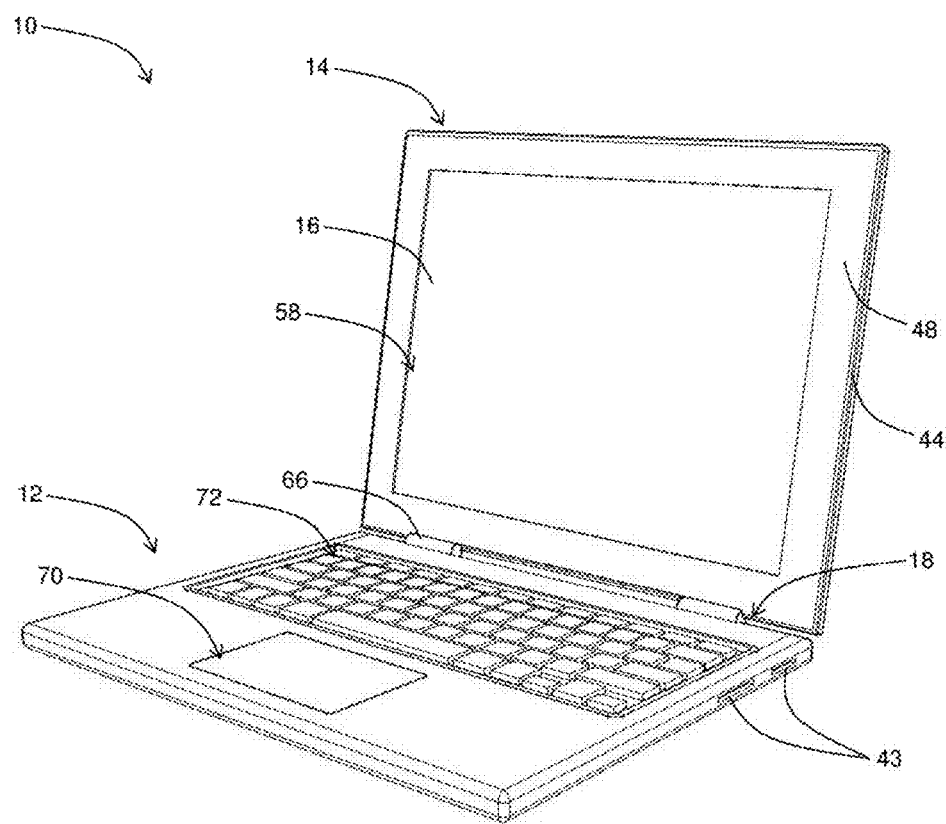
FIG. 1 shows a portable computer according to an embodiment of the present disclosure.

Turning to the drawings, FIG. 1 shows a portable computer 10 in the form of a "notebook" or "clamshell" computer with a base 12 configured to rest on a surface and to support a lid 14 including a screen 16. Lid 14 is connected to base 12 by a hinge 18 that allows the lid 14 to close against the base 12 and to be opened by rotation away therefrom into a user-selectable viewing position during use of the computer 10.

Base 12 includes a keyboard 72 and a trackpad 70 for user input to computer 10. The trackpad 70 can also be referred to as a touchpad and can include any type of touch-sensitive input, operating by capacitive, magnetic, resistive, surface-acoustic wave or other forms of touch-sensitivity. Both the keyboard 72 and trackpad 70 are mounted to base so that they are exposed at (or otherwise available for user interaction on) an outside surface of the upper wall 26 of the base 12. It is noted that the terms "upper", "lower", and other terms related to relative positions of elements are done with respect to the frame of reference depicted in FIG. 1. Such terms are used for convenience and do not limit the actual positions of the elements should the device be repositioned.

Figure 2:
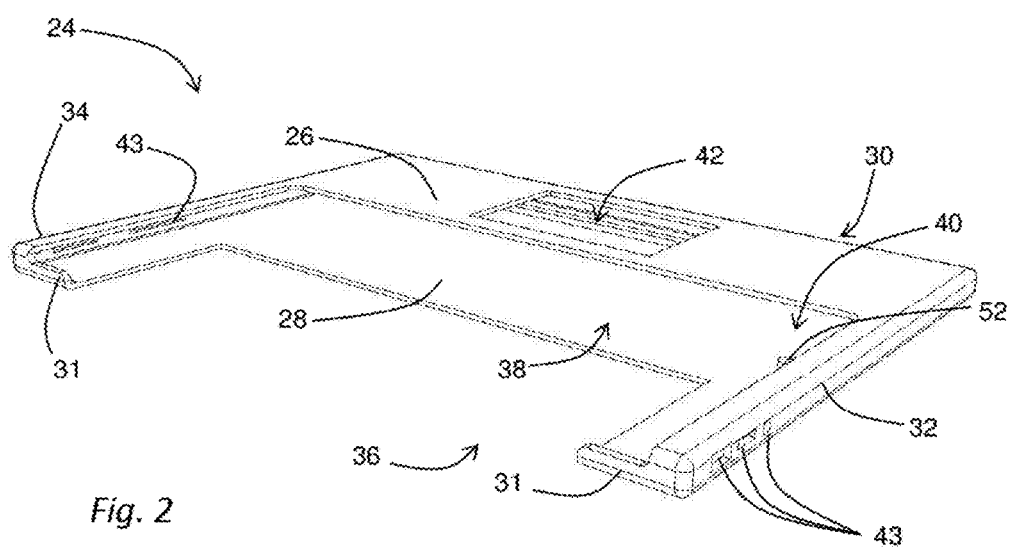
FIG. 2 shows a base housing unit that can be used as a portion of the portable computer of FIG. 1.

Base 12 includes a housing 24, shown in FIG. 2, that consists of a unitary material structure that includes the upper wall 26, a lower wall 28 that is spaced apart from and opposes upper wall 26, a front wall 30, and two side walls 32 and 34, that extend generally vertically between the upper wall 26 and lower wall 28. The unitary housing structure can also include at least partial rear walls 31 that can, for example, extend upward from lower wall 28. In such a unitary structure, a single piece of material includes the aforementioned walls, 26, 28, 30, 31, 32, and 34, with any one of these walls being solidly, or unitarily, connected with the adjacent walls by continuous, uninterrupted, sections of the same material. For example, the housing 24 can be made from a single piece of plastic or metal wherein the walls are integrally formed with the adjacent walls without any joining in the form of fastening, gluing, welding, or metallic joining such as soldering, braising or the like. Plastic materials can include polycarbonate (PC), ABS, PCABS, or the like. Metal materials can include aluminum, aluminum alloy, magnesium alloys, stainless steel, or the like. Such a housing with the described solid connections between walls can be made by injection molding metal or plastic, by die-casting metal or by a deep drawing process applied to a metal sheet, as described below.

As further shown in FIG. 2, housing 24 defines an open end 36 opposite front wall 30 and bounded by edges of the upper 26 and lower 28 walls, along with edges formed by any partial rear walls 31. Open end 36 provides access to an interior 38 of base housing 24 that is configured to enclose various internal components of the computer 10. Base housing 24 also includes a keyboard opening 40 and a trackpad opening 42 that generally follow the facial profiles of the respective keyboard 72 and trackpad 70 such that they can be assembled therein and accessed by a user. A number of peripheral connection openings 43 to the interior 38 can also be included in housing 24, for example through either of the side walls 32 or 34, and can allow for access to peripheral connections for computer 10 such as for a power adapter plug, a USB device, one or more memory cards, audio devices, or the like.

Housing 24, when configured as a single piece of material that includes upper 26 wall lower wall 28, front wall 30, side walls 32 and 34, and rear wall portions 31, can be stronger than other notebook computer housing structures. In particular, the torsional strength (or resistance to axial twisting, can be increased relative to multi-part housing structures. This can make the housing 24, and accordingly the computer 10 overall, more resistant to, for example, being dropped on a side edge or a corner. Additionally, such a housing configuration can make the assembly process of the computer 10 easier and can further enhance the visual appearance of the computer 10 by eliminating parting lines, seams, or fasteners associated with assembling multiple components into a single housing.

As shown in FIG. 1, lid 14 can include an outer housing 44. Outer housing 44 can define a cavity therein that is configured to receive components including a display assembly including screen 16. Lid 14 also includes a bezel 48 that is attached to upper housing 44. Bezel 48 can be configured to surround at least part of the display screen 16 associated with lid 14. As further shown in FIG. 5, bezel 48 can help retain the display assembly that is configured to be positioned within lid 14. As such, bezel 48 can contact the display assembly 60 on a side thereof opposite upper housing 44. Bezel 48 also defines a display opening 58 through which at least the screen portion 16 of the display assembly is viewable by a user. The distance by which bezel 48 extends inward can vary depending on the configuration of, for example, the display assembly itself and/or the materials from which lid housing 44 is constructed.

The upper housing 44 of lid 14 can be integrally formed with bezel 48 as a unitary housing configured with multiple, solidly joined, walls of a single piece of material. In such an example, housing 44, which includes bezel 48, can also define an open end that is positioned between the upper housing 44 and the bezel 48. Such an open end can be bounded by edges of the surrounding walls. Such an arrangement is further shown and described in U.S. Provisional Patent App. No. 61/672,041 ("the '041 application"), the disclosure of which is incorporated by reference herein in its entirety.

As shown in FIG. 1, hinge assembly 18 can connect base 12 with lid 14. Hinge assembly 18 (shown in FIG. 3) can include a base portion 62 that is configured to attach with base housing 24 and to cover open end 36 thereof. Similarly, a lid portion 64 of hinge assembly 18 can attach with lid housing 44. In the example shown, lid portion 64 can connect with lid 14 by extending through a portion of lid 14 defined between bezel 48 and upper housing 48. In such an example, lid portion 64 can connect with upper housing 44 prior to assembling display assembly 60 with upper housing 44 and assembly of bezel 48 therewith, or base portion 62 can be affixed over open end 36 of base housing 24 before assembling lid 14 around lid portion 64 of hinge assembly 18. In a variation, such as that discussed above, wherein lid 14 includes a single piece housing structure, lid portion 64 can be configured to cover an open end thereof in a manner similar to that of base portion 62.

A joint 66 or a plurality of joints 66 can connect base portion 62 to lid portion 64 and can be configured to allow base portion 62 to rotate with lid portion 64 to provide the desired range of rotation between base 12 and lid 14. The exemplary joint 66 shown in the figures is in the form of a barrel, or piano, style hinge, but other forms of notebook computer hinges can be implemented in a similar structure.

As shown in FIGS. 3-14, base housing 24 can be configured to work with base portion 62 of hinge assembly 18 to retain appropriately-configured internal components within base 12. Specifically, base housing 24 can be configured to retain one or more batteries 68, a trackpad assembly 70, a keyboard assembly 72, and a board assembly 74. These components can be configured to contact one another, various portions of the interior 38 of base housing 24, and portions of a surface of hinge base portion 62 that cover open end 36 such that the components are retained within base housing 24 and are secured in their respective positions.

Figure 3:
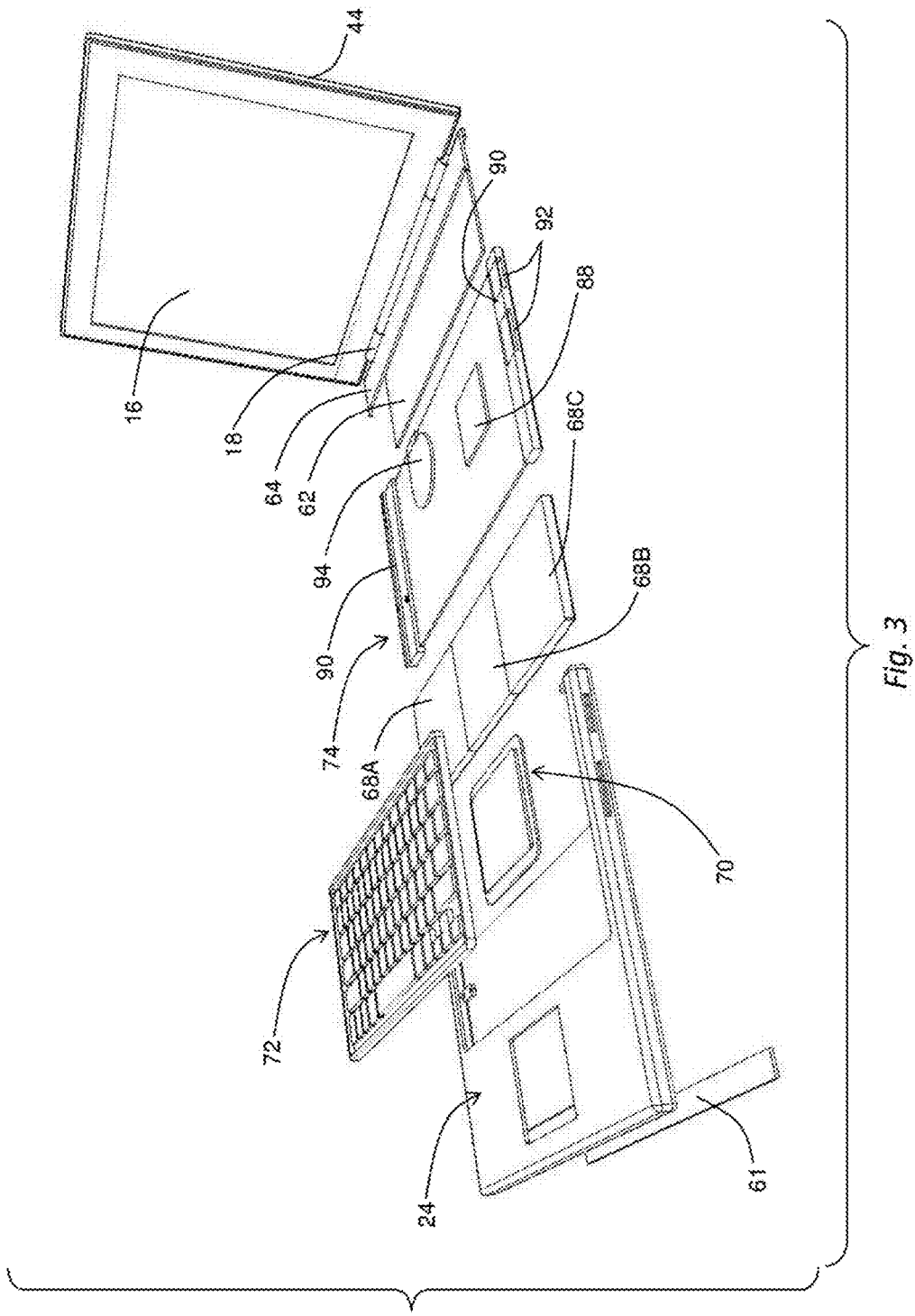
FIG. 3 shows an exploded view of the portable computer of FIG. 1 and various components that can be included therein.

As shown in the exploded view of FIG. 3, the components as well as interior 38 of base housing 24 can be configured such that the components can be slid into base housing 24 through open end 36 thereof. The components can further be configured such that they engage with each other and with base housing 24 such that the positions of the components are maintained once assembled in a particular manner. In the example shown in FIG. 4 and in the cross section view of FIG. 14, the one or more batteries 68 can be configured to contact the interior of lower wall 28 and the front wall 30 along portions thereof. For instance, batteries 68A and 68C can be configured to contact respective portions of the adjacent ones of side walls 32 and 34 with battery 68B positioned between and in mutual contact with batteries 68A and 68C. The batteries 68 can be configured to be spaced apart from the interior of upper wall 28. This configuration can allow for trackpad assembly 70 to be positioned between at least portions of the batteries 68 and upper wall 28.

Trackpad assembly 70 can include various sub-components commonly associated with trackpads or other touch-sensitive input devices. This can include a touch sensitive substrate 76 that defines the actual surface that the user interacts with. The trackpad assembly 70 can also include a support structure 78 that can retain substrate 76 and can include associated circuitry or other functionality, such as structures to provide a clickable trackpad surface or the like. Support structure 78 can be configured to extend outwardly around substrate 76 such that substrate 76 can fit within opening 42 with support structure contacting the portion of upper wall 26 that surrounds opening 42. Opposite the upper wall 26, support structure 78 can contact one or more of the batteries 68. In such a configuration, batteries 68 and support structure 78 can be configured such that, when stacked atop one another, they extend completely between lower wall 28 and upper wall 26. This can, among other things, retain the position of trackpad assembly 70 through a combination of the fit of substrate 76 within opening 42 and the friction generated between the batteries 68, the trackpad assembly 70 and the upper and lower walls 26 and 28.

Figure 4:
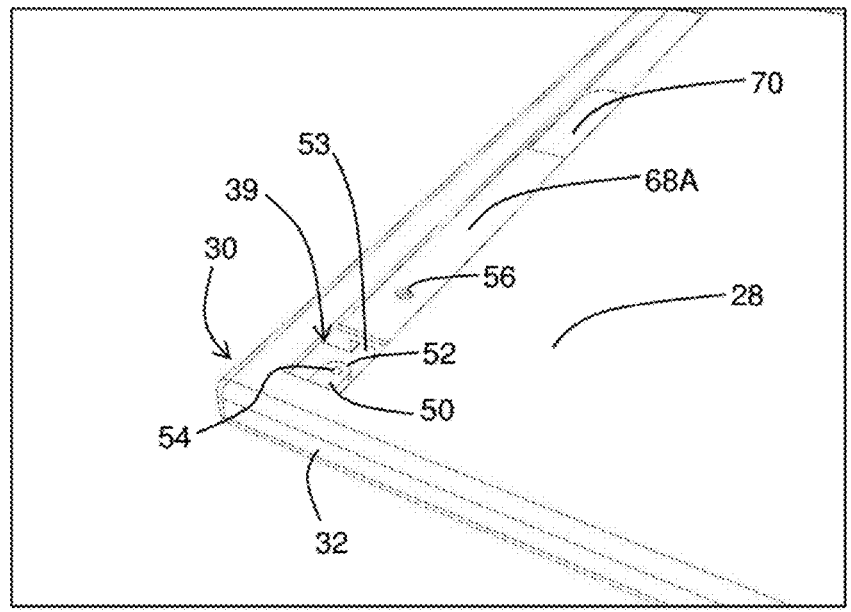
FIGS. 4 and 5 show detail views of a portion of the computer during assembly thereof.

As illustrated in FIG. 4, the interior of base housing 24 can include one or more features that can be configured to provide structural support for the housing 24 itself and/or to provide points of attachment for one or more of the internal components of base 12. In one example where base housing 24 is of a plastic material (such as PC, ABS or a composite thereof), such features can be in the form of ribs 5050 and/or bosses 5252 that can be molded into base housing 24 to be integral therewith. For example, ribs 50 can be formed with housing 24 to be connected with and extend from the interior of one or more of the walls of housing 24. For example, a rib 50 can be configured to extend from side wall 32 and upper wall 26, lower wall 28, or both. Other ribs 50 can similarly extend from side wall 34 or front wall 30, also connecting with either upper wall 26, lower wall 28 or both. In such a configuration, ribs 50 can add to the strength or rigidity of housing 24, which in some configurations can allow for a lower overall wall thickness than without such ribs 50.

Similarly, bosses 52 can be integrally formed with housing 24 so as to extend from one of the walls, including upper wall 26, lower wall 28, front wall 30, or side walls 32 and 34. In a variation, such as that shown in FIG. 4, a boss can be adjacent to or otherwise formed on the end of a corresponding rib 50. Bosses 52 can include a threaded hole 54 configured to receive a screw 98 therein such that one or more of the internal components can be affixed with housing 24 using a screw 98 or the like configured to extend through a through hole 56 in the component to engage with the threaded hole 54.

Figure 5:
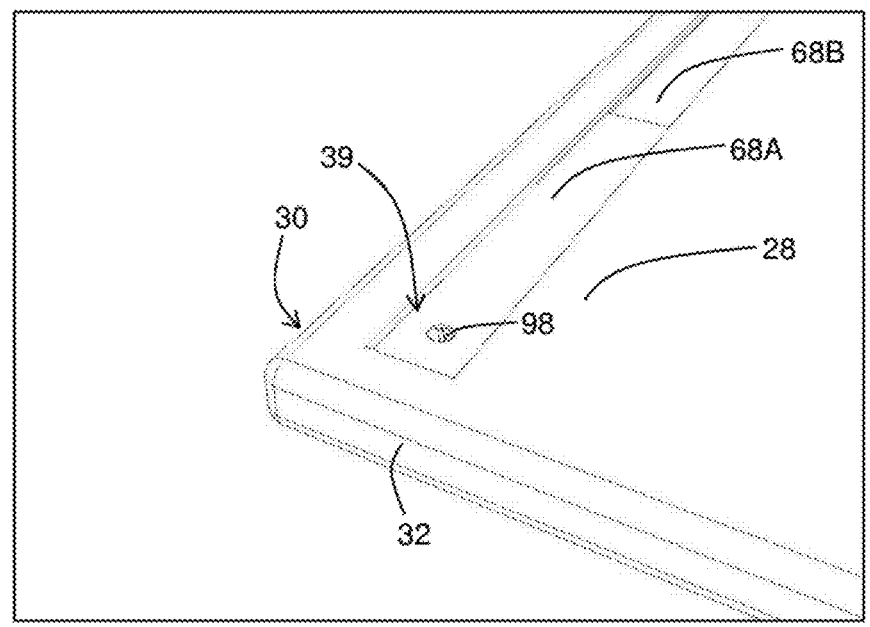

As shown in FIG. 4, rib 50 can extend inwardly away from side wall 32 and can also be connected with upper wall 26. A boss 52 can further be formed with housing 24 at the end of rib 50 and can include a threaded hole 54 therein. Battery 68A can include a slot 53, for example, that is configured to receive boss 52 and rib 50 therein such that battery can be inserted within housing to the inside of rib 50. Battery 68A can then be positioned against front wall 30 (as shown in FIG. 5) and such that slot 53 aligns with rib 50. Battery 68A can then be slid outwardly such that rib 50 and boss 52 are aligned within slot 53. A screw 98 can then be assembled through a through hole 56 in battery 68A and can be engaged with threaded hole 54 to affix battery 68A within housing 24. A similar rib 50 and boss 52 can be configured to extend from the opposite wall 34 such that another battery 68C can be configured to attach with housing 24 on the opposite side thereof. Once batteries 68A and 68C are positioned against respective side walls 32 and 34, battery 68B can be slid into housing 24 and positioned between batteries 68A and 68C. This arrangement can help to secure batteries 68A and 68C within housing 24 with ribs 50 alone, including without the use of screws and corresponding bosses 52.

In either example, battery 68B can be configured with a slot and a through hole similar to that discussed with respect to battery 68A to align with a rib 50 and integrated boss 52 that extend from front wall 30. Such a structure can further include another boss 52 formed on a portion thereof that extends to align with trackpad assembly 70 such that trackpad assembly 70 can be attached with housing 24 by a similar structure. Alternatively, trackpad assembly 70 can be configured such that a portion thereof also aligns with the rib and boss 52 with which battery 68B connects so that a single screw inserted after positioning trackpad assembly 70 within trackpad opening 42 and after positioning the batteries 68A, B, and C, can secure both battery 68B and trackpad assembly 70 with housing 24.

In another example, bosses can be configured without threaded holes therein. In such an example, any internal components that are selected for connection with housing 24 using bosses 52 can be attached therewith using plastic plugs or other structures that can be ultrasonically welded or otherwise attached with bosses 52. Alternatives to ultrasonic welding include gluing or the like.

Figure 6:
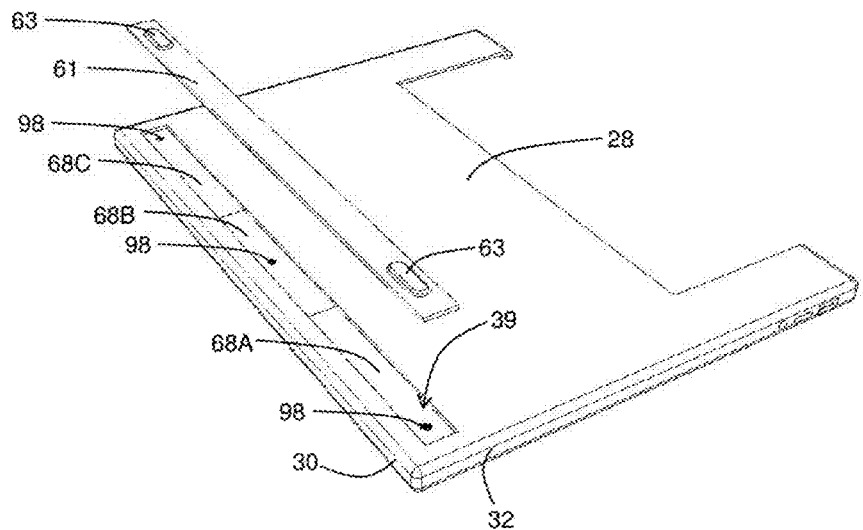
FIGS. 6 and 7 show a portion of the computer during assembly thereof.
Figure 7:
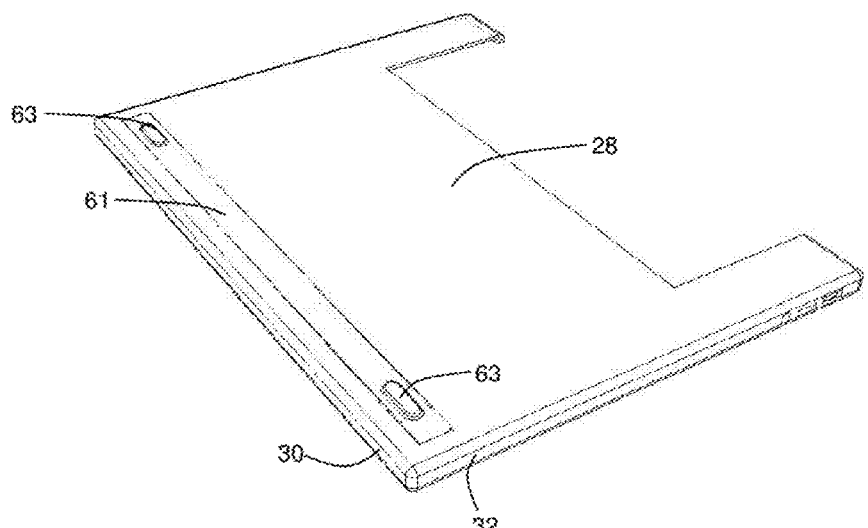

Housing 24 can include an access opening 39 through lower wall 28 that can align with the bosses 52 and corresponding threaded holes 54 therein. The access opening can also then align with any through holes 56 in the components that are configured to align with and be attached to the bosses 52 using the threaded holes 54. Such a configuration can allow for direct access to assemble and disassemble any screws from holes 54 during assembly or repair of computer 10. Once the internal components and screws (or alternative structures, as mentioned above), are affixed within housing, as shown in FIG. 6, a cover 61 can be attached over access opening 39. As shown in FIG. 7, cover 61 can have feet 63 integrally formed therewith that can be configured to provide points of contact for base 12 with a surface. In an example, the feet 63 can be integrally formed with cover 61 such that both feet 63 and cover 61 are of the same material. In some instances, it may be preferable for feet 63 to be of a high-friction material to provide a slip resistant point of contact with a surface. In such an instance, cover 61 can be made of a high-friction material such as thermoplastic elastomer (TPE), rubber or the like. In an example, where cover 61 and integrated feet 63 are made from such a material, a reinforcing member of a stiffer material can be affixed on the inside of cover.

Cover 61 can be configured to attach to lower wall of housing 24 over access opening 39. A number of different structures can be used to connect cover 61 to housing 24. In an example, cover 61 can be configured with attachment features that snap onto ribs 50 or can form a gasket fit with the edge of opening 39. Additionally, various adhesives can be used for such attachment or to augment attachment using other features.

Figure 8:
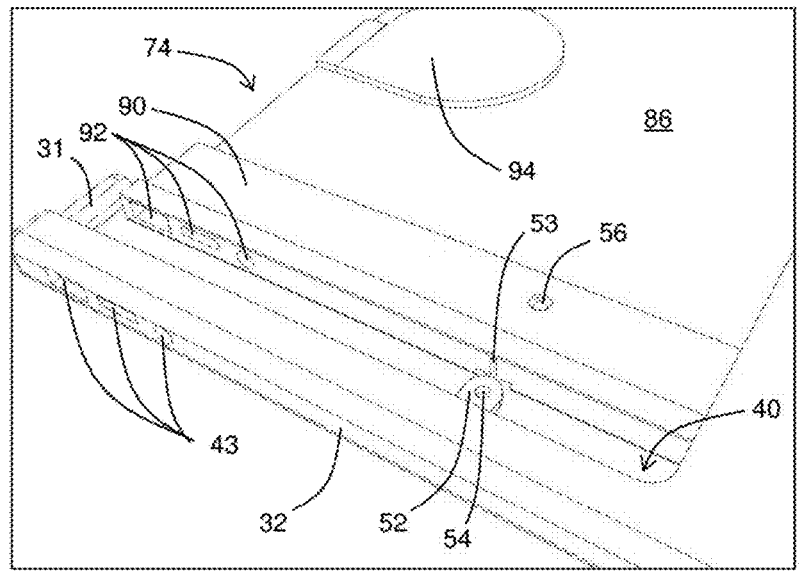
FIGS. 8 and 9 show detail views of another portion of the computer during assembly thereof.
Figure 9:
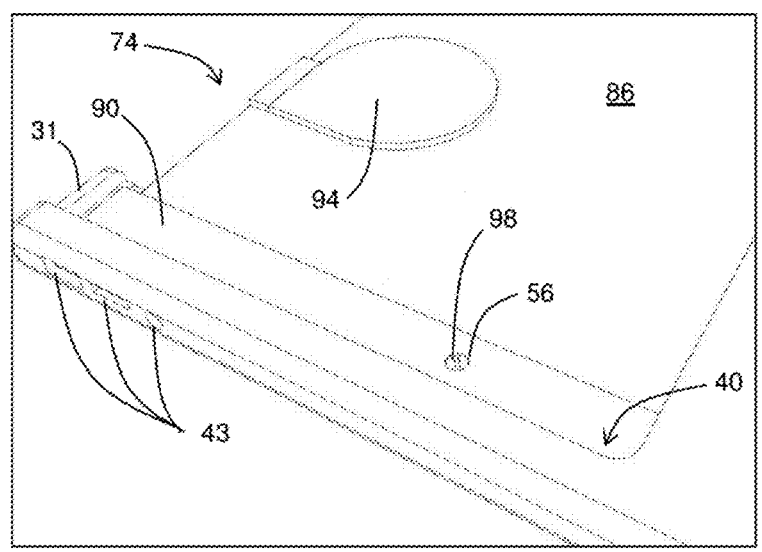

Board assembly 74 can be configured to fit within housing 24 in at least a portion of an area between batteries and open end 36. As shown in FIGS. 3, 8, and 9, board assembly 74 can include a printed circuit board 86, or a plurality of printed circuit boards attached together, supported on a common structure, or the like. The board 86, shown in FIG. 3, can be in the form of a motherboard or the like that can provide interconnections between various semiconductor chips or other microelectronic elements that can be carried thereon as well as with external components, such as power supplies, memory, etc. In the simplified example shown in the figures, board 86 is shown including a microprocessor 88 carried thereon. The microprocessor 88 can implement various functionality of the computer 10, including receiving user input, providing output either directly or through communication with a graphics processor or the like, and allocating memory usage and retrieving stored data from memory. Board 86 is also shown with a fan 94 thereon to provide cooling for the components within base 12. The board 86 can also include one or more memory structures in the form of RAM or other similar components. The board 86 can also include connections for communication with the batteries 68, the trackpad assembly 70, the keyboard 72 and the display assembly 60. Board assembly 70 can also include one or more speakers or connection components for attachment with separate speakers.

Board assembly 74 can also include end units 90 that can be positioned on opposite sides of board 86 that are disposed toward the side walls 32, and 34 of the base housing 24. Additionally or alternatively, end units can be positioned along the sides of board 86 that extend between those adjacent the side walls. In another example, board 86 can be supported by or contained within a single housing unit that substantially covers a portion of the board 86 itself. As shown, end units 90 are configured to contact the lower wall 28 of base housing 24 on an interior surface thereof. End units 90 are also configured to respectively contact the interior surfaces of the side walls 32 and 34 with board 86 spacing apart end units 90 to maintain such contact. In this arrangement, board 86 can be supported in a position such that it does not directly contact the interior of base housing 24 and such that the delicate components carried thereon are isolated from coming into contact with other internal features of the base 12, which could cause damage thereto.

Base housing 24 can include additional bosses 52 and/or ribs 50, as discussed above, to facilitate location and attachment of board assembly 74 therein. As shown in FIG. 8, a rib 50 can extend away from side wall 32 and along lower wall 26 and can end with a boss 52 spaced apart from side wall 32. Boss 52 can include a threaded hole 54 therein, and the adjacent end unit 90 can include a matching slot 53 and through hole 56 such that when board assembly 74 is inserted within housing 24, the slot 53 can receive the rib 50 and boss 52 and through hole 56 can align with the threaded hole 54 such that a screw 98 can be assembled therewith and used to secure end unit 90, and thus board assembly 74 to housing 24, as shown in FIG. 9. Additional bosses 52 and/or combinations of ribs 50 and bosses 52 can be similarly used at additional locations to provide further support or attachment points between housing 24 and board assembly 74.

End units 90 can also include various input or output port structures 92. Such ports 92 can include connections for an external power supply, or connections specially configured as, e.g., USB, Fire-Wire, Thunderbolt, HDMI, or other similar connections. Ports 92 can also include SD card reader slots, or audio input or output connections. The conductive features of the ports can connect with the circuitry of the board 86 for communication therewith. Further the ports 92 can align with port openings 43 in the base housing 24 such that components can connect with ports 92 through housing 24.

Figure 10:
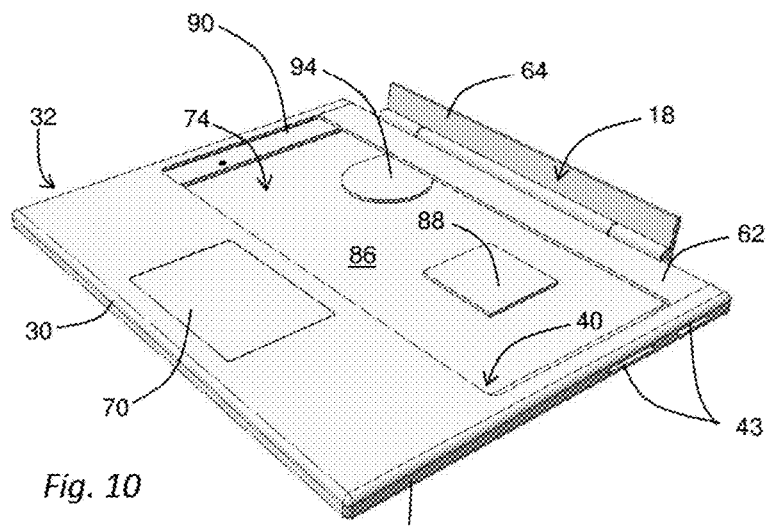
FIGS. 10-13 show the computer during further steps of assembly thereof.
Figure 11:
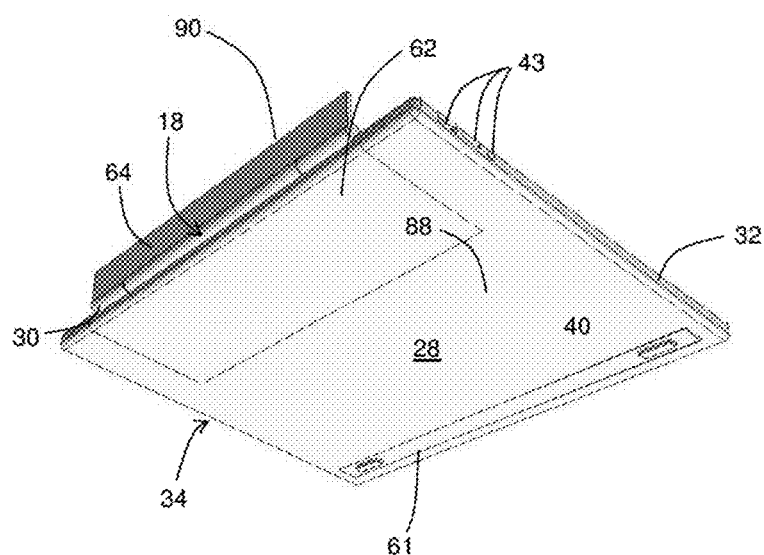

As shown in FIGS. 10 and 11, base portion 62 of hinge assembly 18 can be configured to close open end 36 of base housing 24 such that the internal components of base 12 are retained therein. As shown in the cross-sectional view of FIG. 14, base portion 62 can be configured to contribute to the retention of the internal components of base 12 in their respective positions. In the example shown, wherein batteries 68 contact the interior of front wall 30 and board assembly 74 contacts batteries 68 opposite front wall 30, an interior surface 96 of hinge base portion 62 can contact board assembly opposite battery 68. In this manner, these interior components of base 12 can be in continuous contact between front wall 30 and surface 96 of hinge base portion 62, which can help maintain the components in their positions therebetween. Other configurations for such internal components are possible in which continuous contact between components is maintained between front wall 30 and hinge base portion 62 and could be determined based on the particular components used and the general shapes thereof. Hinge base portion 62 can affix to base housing 24 by various fasteners that engage between base housing 24 and hinge base portion 62. In an example, snap-fit structures can be used to affix hinge base portion 62 with base housing 24. As further alternatives, press-fit structures or adhesives can be used.

Hinge base portion 62 can take on any number of possible forms to both cover open end 36 of base housing 24 and to optionally provide at least a portion of a retention force on the internal components of base 12. In the example shown in the figures, hinge base portion 62 is configured to extend along portions of both upper wall 26 and lower wall 28 of base housing 24 substantially flush therewith. As such, hinge base portion 62 can partially define portions of both upper wall 26 and lower wall 28. Further, the portion of hinge base portion 62 that extends with upper wall 26 can define at least a side of keyboard opening 40 such that, when keyboard assembly 72 is assembled with base 12, it can be in contact with hinge base portion 62 as well as upper wall 26 of housing 24. In other examples, upper wall 26 and lower wall 28 can extend substantially to open end 36 of housing 24 such that hinge base portion 62 can extend only along open end 36.

As shown in FIG. 11, lower extension 65 of hinge base portion 62 can be configured to extend below a portion of board assembly 74. In such an example, it can be useful to further configure lower extension 65 to contribute to the removal or dissipation of heat from within base housing 24, as the components of board assembly 74 contribute to the need for such heat removal. In one example, lower extension can be configured with vents that can align with the input or output areas of a fan 94 on board assembly 74 or the like. In a further example, hinge base portion 62 can be made of metal or another heat-conductive material such that extension 65 can conduct heat from the interior of housing 24 to the exterior thereof. The heat-conducting properties of such a hinge base portion 62 can be enhanced by connecting hinge base portion 62 with a portion of board assembly 74 with a heat-conductive material. For example, board assembly 74 can include a heat sink or the like that can be positioned adjacent extension 65, and a conductive paste can be disposed therebetween such that heat from the heat sink is conducted to hinge base portion 62 for dissipation thereof into the ambient air surrounding computer 10.

Examples of hinge assembly 18 can include wire routing therethrough such that a connection can be made, for example, between board assembly 74 and a display assembly within lid 14 to supply power and a video signal thereto. Additionally, wire segments can be included with hinge assembly 18 that extend from base portion 62 and lid portion 64 thereof for connection with wire segments connected with board assembly 74 and display assembly 60, respectively. Similar wiring can be present among components within base housing 24 to connect, for example, board assembly 74 with trackpad assembly 70 and/or keyboard assembly 72. Additionally or alternatively, conductive connections can be positioned on adjacent components so that, when assembled into base housing 24, electrical connection is achieved between components, for example battery 68 and board assembly 74. Hinge base portion 62 can also include an opening or openings that align with an output of fan 94 to allow air to pass there through.

Figure 12:
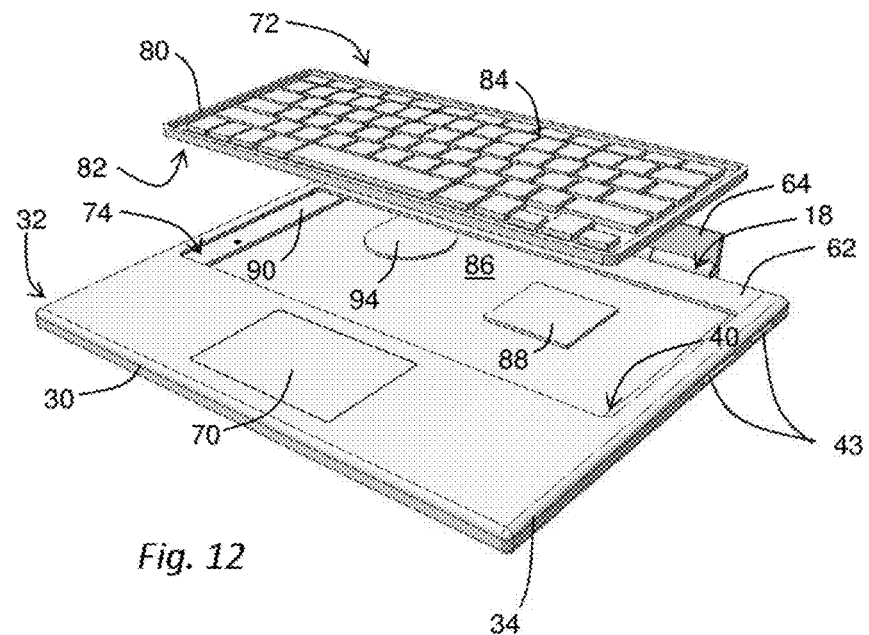
Figure 13:
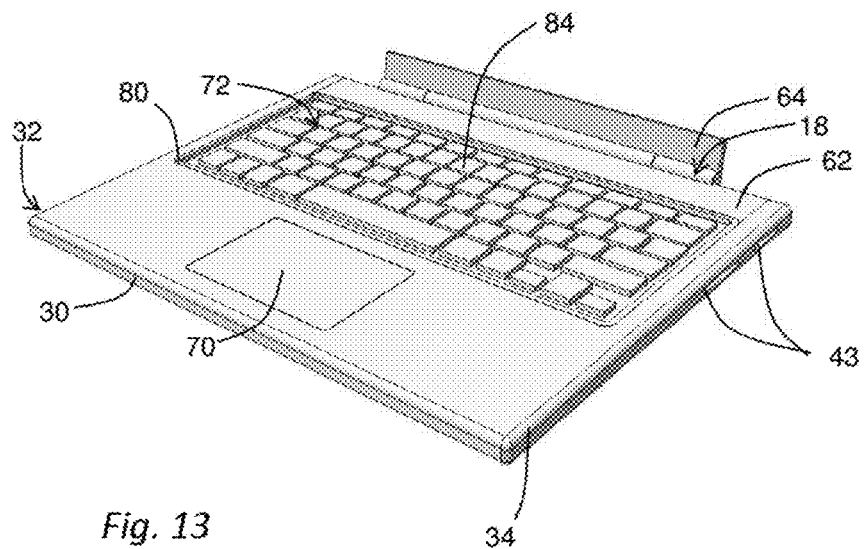

As shown in FIGS. 12 and 13, keyboard assembly 72 can be configured to be positioned above board assembly such that keys 84 are accessible within keyboard opening 40 in base housing 24. In such a configuration, a lower surface 82 of keyboard can rest on end units 90 of board assembly 74. End units 90 can further be configured to provide the spacing necessary to maintain the desired position for keyboard assembly 72. For example, when end units 90 are positioned within base housing 24 such that they contact the interior of lower wall 28 or bosses 52 that project away from lower wall 28, they can support keyboard assembly 72 such that a raised portion 80 of the keyboard assembly 72 surrounding keys 84 fits within opening 40. Such a configuration can further facilitate the attachment or fixation of keyboard assembly 72 within housing 24 by positioning an attachment feature of keyboard assembly 72 at an appropriate location to engage with a corresponding feature of housing 24.

In one example, keyboard assembly 72 can include a compressible ring or other feature disposed around an outer periphery thereof that can be configured for a snap-fit arrangement within opening 40. In such an arrangement, housing 24 and/or board assembly 74 can be configured to position keyboard assembly within housing 24 relative to opening 40 such that the ring or other snap-fit feature is positioned in contact with the interior of upper wall 26 adjacent opening 40. This arrangement can be further configured such that some pressure exists between the upper wall 26 and the ring or other snap-fit feature to help maintain the desired position of keyboard assembly 72. Such a configuration could also cause pressure between keyboard assembly 72 and board assembly 74 and between board assembly and housing 24. In a variation, housing 24 and board assembly 74 can be configured such that lower surface 82 of keyboard assembly 72 contacts appropriately-configured ribs 50 or bosses 52 rather than end units 90 of board assembly 74.

In another variation, keyboard assembly 72 can include a support structure with a raised portion surrounded by an outwardly extending flange in a manner similar to trackpad assembly 70 such that keyboard assembly 72 can engage with keyboard opening 40 in a manner similar to that in which trackpad assembly 70 engages trackpad opening 42. Such an arrangement is further shown and described in the '041 application, referenced above.

Any of the above-described configurations of board assembly 74 and keyboard assembly 72 can allow for board assembly 74 to be easily removed for repairs, upgrading (such as replacing or adding memory), or replacement with a similarly-configured board assembly 74 to be swapped for the existing board assembly. This can be done for purposes of repair, such as replacing a damaged board assembly 74 or upgrading, such as by replacing a board assembly 74 for a new board assembly 74 with, for example, a faster processor or the like. This configuration can also streamline custom manufacture of notebook computers, allowing for a number of pre-assembled board assemblies 74 with different processors, memory configurations, etc. to be provided and selected from according to customer-specifications during assembly of computer 10. In addition, the above-described configuration of the other internal components can similarly provide for easier repair/replacement thereof.

Figure 16:
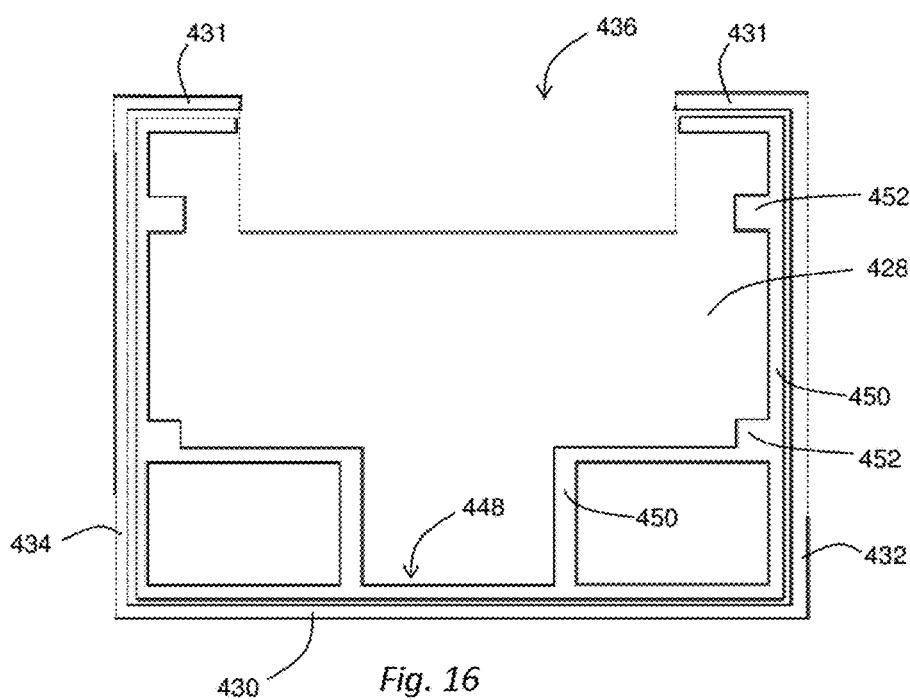
FIGS. 16 and 17 show an alternative structure for a base housing of a notebook computer that includes an internal frame in another aspect of the present disclosure.
Figure 17:
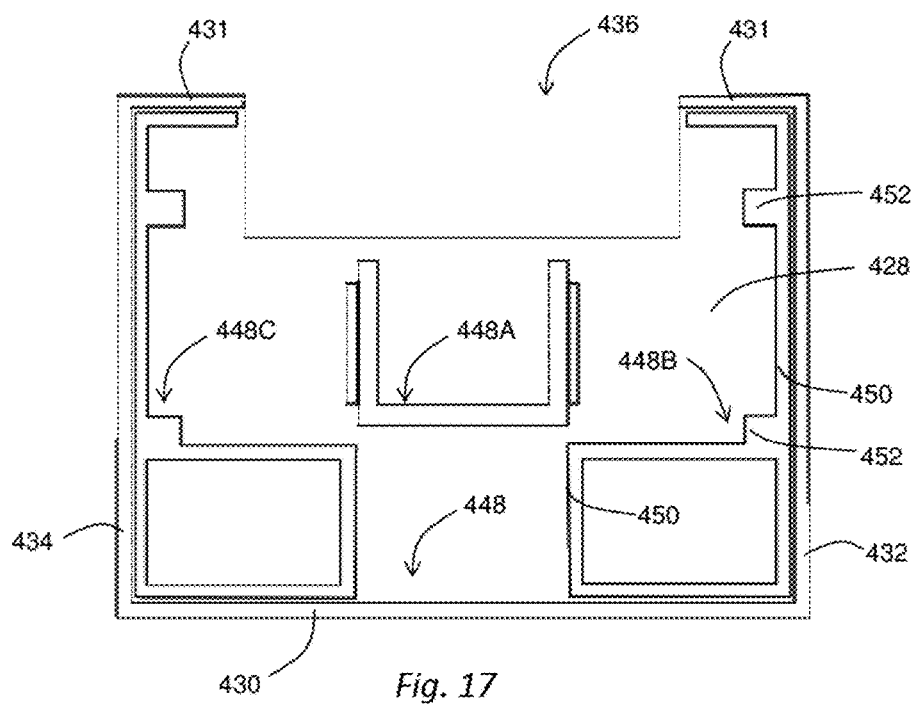

An alternative example of an internal structure of base housing 24 is shown in FIGS. 16 and 17. In such a structure, internal supports and/or attachment features for components internal to base housing 424 can be included on a frame 448 that can be assembled within and attached to interior surfaces of housing 424. Frame 448 can include various components or portions 450 and 452 thereof that are similar to the ribs 50 or bosses 52 discussed above and can add to the overall rigidity of housing 424 and can provide support for the various walls thereof to resist unwanted flexing or breaking thereof. Frame 448 can also include threaded holes therein that can be used to attach components, such as batteries, a trackpad assembly, a keyboard assembly, or a board assembly, thereto. Frame 448 can be made from metal, various plastics, or other rigid materials. Frame 448 can be structured to attach within housing 424 using adhesives or the like or can be structured to utilize a pressure-fit to secure a position within housing 424. In another example, specially-configured bosses and/or ribs (not shown) can be included in housing 424 to provide points of mechanical attachment with frame 448 such as by screws or the like. It is also possible to use a combination of ribs and bosses within housing 424 in combination with a frame 448 to provide a desired reinforcement structure for housing 424. In such a structure, the frame 448 used can include multiple frames that are smaller than that shown in FIG. 16 that can be configured for strategic location within housing 24.

In the example of FIG. 17, frame 448 can be made from multiple components 448A, 448B, and 448C that can be assembled within housing 424 into a single structure. This can be done, for example, to allow frame 448 to be positioned inside of any undercuts formed by rear wall portions 431 on housing 424. In the example shown in FIG. 17, frame portions 448A and 448C can be assembled within housing by being passed through open end 438 and being positioned adjacent respective walls 434 and 432. Subsequently, frame portion 448B can be assembled between frame portion 448A and 448C to at least partially secure the assembled frame 448 therein.

Figure 14:
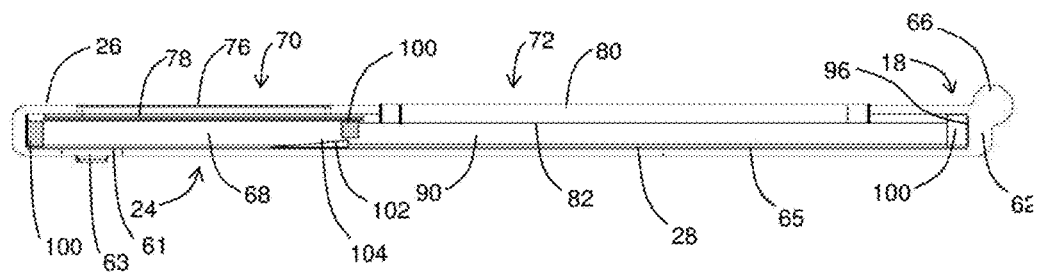
FIG. 14 shows partial cross-sectional view of the base assembly of the portable computer of FIG. 1.

As shown in the cross-sectional view of FIG. 14, compliant inserts 100 can be positioned between various internal components of base 12. These inserts 100 can be compressible and can be made of various foams, rubbers, elastomers or the like. The presence of inserts 100 between components or between a component and one of the walls of housing 24 can take up extra space between components or between a component and a wall that can arise due to manufacturing tolerances. This can allow for a more precise fit of components within housing 24 and can minimize the movement of components within housing 24 without requiring particularly tight tolerances of the components or of housing 24. These inserts 100 can be affixed to or assembled with the various components in strategic positions. For example, as shown in FIG. 6, an insert 100 can be affixed to battery 68 at a location such that insert 100 will be positioned between front wall 30 and battery 68. As also shown, another insert 100 can be attached to keyboard assembly 72 in a position to contact surface 96 of hinge base portion 62. Additional inserts 100 can be affixed to either trackpad assembly 70 or board assembly 72 to contact the other of these components. Still further inserts 100 can be positioned between battery 68 and trackpad 70, between board assembly 74 and keyboard assembly 72, or between any of the components and upper wall 26, lower wall 28, or side walls 32 and 34.

As also shown in FIG. 14, one or more wedge elements 102 can also be assembled within base housing 24 adjacent one or more of the above-described internal components. The use of such wedge elements 102 can help to retain the desired positions of the internal components within base housing 24. In the example shown in FIG. 14, wedge element 102 is positioned beneath a battery 68 such that on one side it contacts battery 86 and, on the other, it contacts the interior surface of lower wall 28. As also shown, the portion of battery 68 that wedge element 102 contacts can include an inclined surface 104 that is configured to mutually contact the wedge element 102 along a portion of the area thereof. This can allow for more even contact of battery 68 with, for example, trackpad assembly 70 on the side opposite wedge element 102. By using wedge elements 102 as shown, battery 68 can be pushed by wedge element 102 toward upper surface 26 of base housing 24, creating pressure of trackpad assembly 70 against the interior of upper wall, between trackpad assembly 70 and battery 68, and the like. This increase of pressure creates friction between the components and between the components and the upper 26 and lower walls 28, which helps maintain the positions of the components.

Additional wedge elements 102 can be positioned between, for example board assembly 74 and lower wall 28, between battery 68 and trackpad assembly 70, between board assembly 74 and keyboard assembly 72, or between any other adjacent components. Accordingly, board assembly 74, trackpad assembly 70, keyboard assembly 72, and any other components can also include inclined surfaces similar to surface 104 of battery 68. Further, wedge elements 102 can be attached to or integrally formed with, for example, board assembly 74 or hinge base portion 62 in the appropriate location to engage with, respectively battery 68 and board assembly 74. In another example, board assembly 74 itself can have a surface thereof that acts like a wedge and is configured to contact an appropriately configured inclined surface on keyboard assembly 72.

Figure 15:
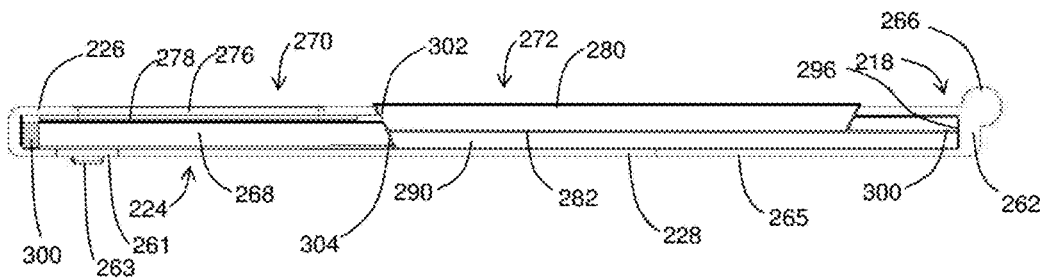
FIG. 15 shows partial cross-sectional view of a base assembly of a portable computer according to another aspect of the disclosure.

In another variation shown in FIG. 15, keyboard assembly 272 can itself be wedge-shaped, tapering from a wider side profile toward raised portion 280 to a narrower side profile toward lower surface 282 to form a wedge surface 302 therebetween. In such an arrangement, at least the components adjacent to keyboard assembly 272 can include inclined side surfaces 304 configured to generally match the tape of the adjacent portion of keyboard assembly 272. This configuration can allow for keyboard, when assembled by movement thereof into opening 240 from outside of housing 224, as described above, to apply a force against the adjacent components by a wedging action as keyboard is moved into its assembled position relative to housing 224. Additionally, board assembly 274 can be similarly wedge-shaped such that any force applied thereto in the direction of lower surface 228 can cause board assembly 274 to also apply a force against adjacent components by a similar wedging action.

This arrangement can be configured to increase the forces between the internal components within base 212 and between internal components and front wall 230, which in other examples can be provided largely by the assembly of hinge assembly 218 with housing 224. By providing keyboard assembly 272 with a snap-fit connection to housing 224, the mutual pressure between the internal components of base 212 can be maintained when keyboard assembly 272 is affixed with base 212. Additionally, other internal components can include inclined surfaces not adjacent keyboard assembly 272 to cause movement of such components toward upper wall 226 and/or lower wall 28 in response to such forces, further helping to maintain such components in desired positions within housing 224.

As discussed above, base housing 24 of a single piece of material and being solidly joined between walls of the type described herein can be made from various materials including various metals or plastics using various fabrication methods. FIGS. 18-21 show various stages in one method for making the base housing 24 for computer 10 that includes injection molding housing 24 from a plastic material. As also mentioned above, lid 14 can also have a substantially single-piece housing that can be made by similar process. These steps, as well as the steps for assembling internal components into housing 24, as described above, are further depicted in the flowchart shown in FIG. 22.

Figure 18:
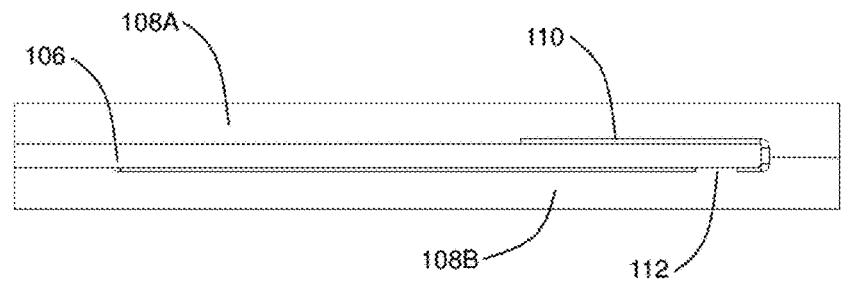
FIG. 18 shows portions of an apparatus that can be used to make portions of a housing for the portable computer of FIG. 1 in a method according to another aspect of the present disclosure.

In the injection molding process, a mold used to form base housing 24 can include three mold units, as illustrated in the cross-sectional view of FIG. 18. These units can include a lower unit 108B, an upper unit 108A and a core 106. The upper and lower units 108A and 108B can be configured to together give the general shape and structure for the outside of base housing 24, and the core 106 can be configured to give the general shape and structure for the interior of base housing 24. In this arrangement, upper and lower units 108A and 108B can define a cavity 110 therebetween that defines the overall volume of base housing 24 and core 108 can extend within such a cavity spaced apart from portions of the cavity by approximately the desired thickness of the walls 24, 26, 30, 31, 32, and 34 of base housing 24. In other examples wherein base housing 24 or lid housing 44 is made from various plastics, the fabrication processes associated therewith can be configured to achieve a final material thickness of between about 1.5 mm and 2 mm (+/−5%).

Figure 19:
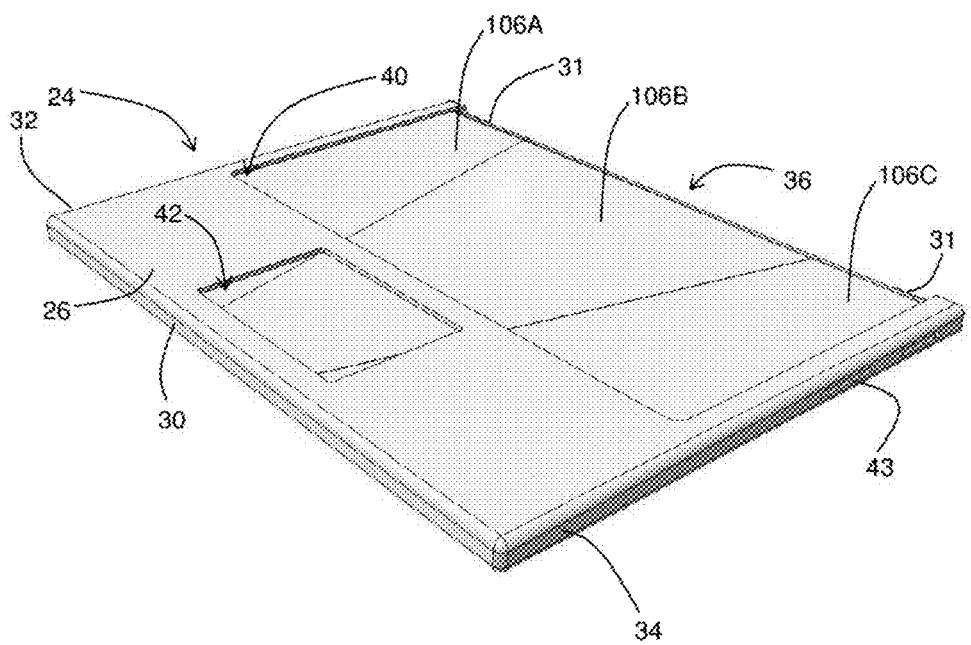
FIGS. 19-21 show steps in a sequence for removal of a portion of the apparatus of FIG. 18 from a base housing made according to the method.

As shown in FIGS. 18 and 19, core 108 can extend into cavity 110 at the desired location for open end 36. Further, upper and lower units 108A and 108B can include projections 112 that contact core 106 in the desired areas for openings in base housing 24, including keyboard opening 40, trackpad opening 42, and access opening 39. Such projections, including the projection corresponding to access opening 39 can help to stabilize core 106 during the injection molding process such as against sagging or other movement and against vibration that can occur during injection of molten plastic into the cavity.

Figure 20:
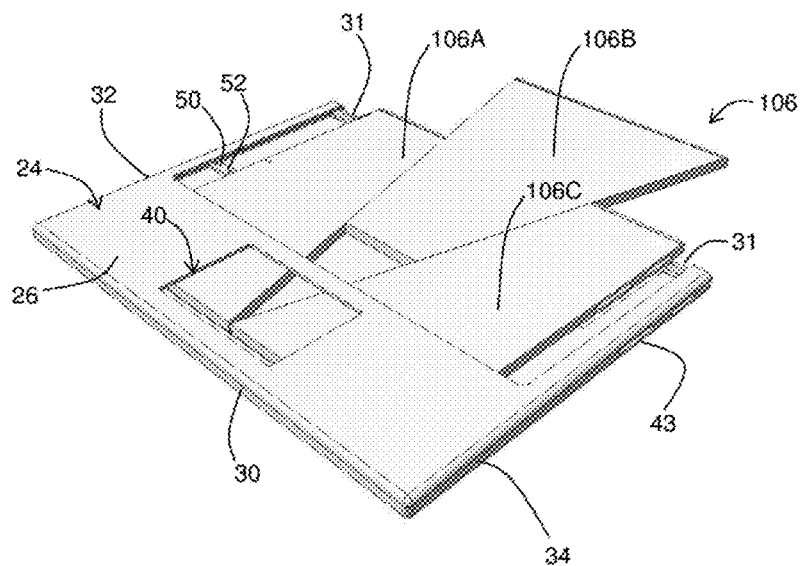
Figure 21:
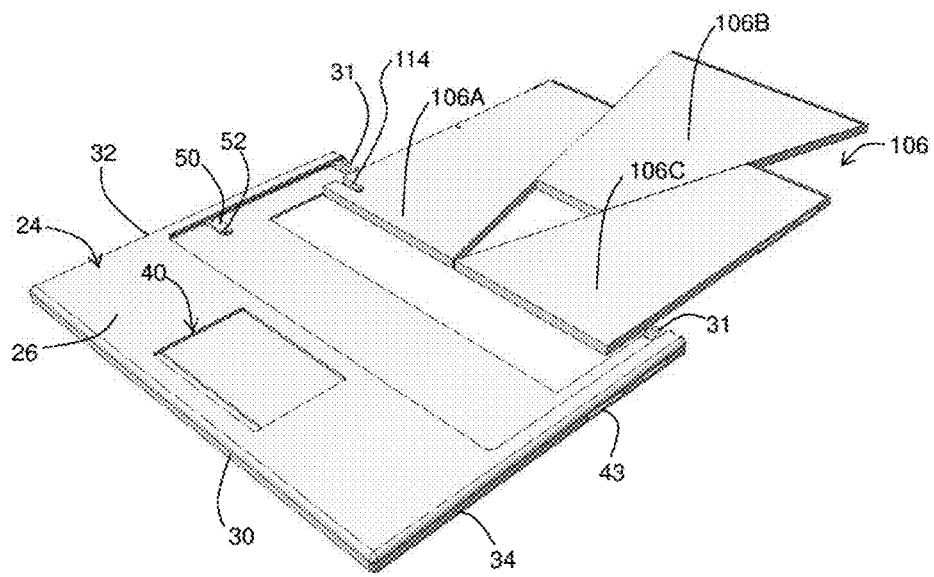

As further shown in FIGS. 19-21, core 106 can include multiple parts. In particular, core 106 can include a central unit 106B, and two side units 106A, and 106C. These three parts can be attached together and mutually configured with central unit 106B being wedge shaped so that movement thereof away from and toward front wall 30 (or the intended location thereof) causes corresponding inward and outward movement of side units 106A and 106B. Such an arrangement can allow for open end 36 to be smaller than an overall profile of base housing 24, as shown in FIGS. 19-21. This can allow base housing 24 to be molded with rear wall portions 31 adjacent to the open end 36 of housing 24. Such a housing can be molded using the mold configuration shown in FIG. 18 in which, after molding base housing 24, central unit 106B can be withdrawn from the interior 38 of base housing 24 causing side units 106A and 106C to move inward to clear rear wall portions 31 at which point the entire core assembly 106 can be removed from the interior of housing 24, which can then be removed from the mold 108A and 108B.

Such an arrangement can also facilitate the formation of ribs 50 and/or bosses 52 that extend along the interior of upper wall 26 or lower wall 28 away from one of the side walls 32 or 34. This can be done by including channels 114 within one or both of the side units 106A or 106C in the desired location and shape of such ribs 50 or bosses 52 with the desired shape of the ribs 50 being sufficient that the inward movement of side units 106A and 106B during removal of core assembly 106 can allow the side units 106A and 106B to also clear the ribs 50 or bosses 52 formed thereby. In an example, the ribs 50 or bosses 52 can be configured to extend away from the corresponding side wall 32 or 34 at a distance that is no greater than the width of the rear wall portion 31 on the same side of housing 24. Any holes 54 to be formed in the bosses 52 can be done using cammed features in either the upper 108A or lower 108B mold unit or can be formed after molding of the housing 24 by drilling or the like. After housing 24 is molded, additional steps can be carried out on housing. Such steps can include removing any flashing that arises from the molding process, for example. Additionally or alternatively, housing 24 can be polished or subjected to other surface treatments to enhance the tactile qualities or appearance thereof.

A similar mold configuration can also be used to form a single-piece lid housing unit, as described above. In other examples, such as that shown in FIG. 1, lid can include a multipart housing structure, including outer housing 44 and bezel 48 that can be injection molded or the like, and assembled together around a corresponding display assembly and associated portions of hinge assembly 18, as also discussed above.

Figure 22:
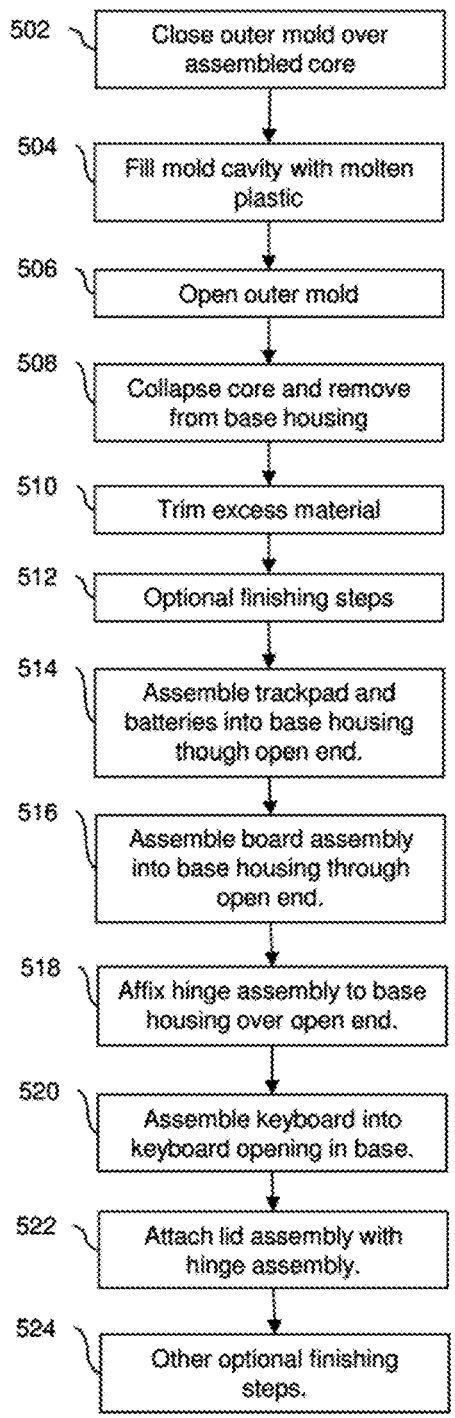
FIG. 22 shows a flowchart illustrating steps in a method of making computer housing components and assembling such housing components with other components to make a computer according to an aspect of the present disclosure.

After formation of base housing 24 and the desired lid housing components (such as outer housing 44 and bezel 48), the various internal components of computer 10 can be assembled into the respective housings (steps 502-524 in FIG. 22). Such steps can be carried out using housings 24 and 44 of the configurations described above, whether made according to the injection molding process, as described above, or the previously mentioned deep drawing or die-casting methods. Further, such a housing can be made using various forms of 3-D printing or the like, including filament deposition modeling using various forms of plastic, or various stereolithographic methods involving laser sintering, ablation, or the like, which can be carried out using plastics or metals. As shown in FIGS. 4-12, the various components associated with base housing 24 can be inserted thereinto through open end 36 and opening 40. The components can be inserted in stages and positioned as desired before subsequent components are placed into housing 24. In an example, trackpad assembly 70 can be placed into housing 24 first and positioned within opening 42, after which batteries 68 can be positioned adjacent front wall 30 and beneath trackpad assembly 70 (step 214 in FIG. 19). The positioning of batteries 68A and 68C can also include positioning of the batteries 68A, 68C to appropriately mate with corresponding ribs 50 or bosses 52 within housing 24 and, if desired, attachment thereof to the bosses 52 using screws or other fastenings, as described above. Electrical connections between components can be made during assembly, such as by attachment of mutually-engaging plugs or outlets or the like.

In the example shown board assembly 72 can then be positioned such that end units 90 are aligned with corresponding ribs 50 and bosses 52 in housing 24. Corresponding slots or through holes in end units 90 can be engaged with or otherwise aligned with the ribs 50 or bosses 52 and board assembly 74 can then be attached to housing 24 by bosses 52 using screws or other attachment structures, as described above.

Hinge assembly 18 can then be affixed with base assembly 12, as shown in FIG. 10, by attaching hinge base portion 62 to the open end 36 of base housing 24 (step 518 in FIG. 22). As discussed above, hinge base portion 62 can be configured to contact a portion of board assembly 74 such that the internal components of base 12 are maintained in desired positions thereof. It is noted that, in embodiments where wires are included in and through hinge assembly 18, such wires can be connected with other wires that can extend from, for example, board assembly 74 prior to attaching hinge assembly 18 to base housing 24. As discussed above, hinge base portion 62 can be attached to base housing 24 by screws, snap-fit or press-fit structures, adhesives or the like.

Keyboard assembly 72 can then be assembled with housing 24 by positioning thereof within keyboard opening 40 (step 520), which can be defined by portions of housing 24 itself and also by portions of hinge base portion 62, as described above. In an example wherein keyboard assembly 72 includes a snap-fit attachment feature that is configured to engage with opening 40, keyboard can be affixed with housing simply by pressing keyboard assembly 72 into opening 40 until such a feature engages. In other variations, attachment features, such as screws can be used to attach keyboard assembly 72 with housing 24. Further, as discussed above, a variation of keyboard assembly 72 can be configured to be similar to trackpad assembly 70 with respect to its assembly with base housing 24. In such a variation, keyboard assembly 72 can be assembled with base housing 24 prior to assembly of board assembly 74 or hinge assembly 18 therewith.

As discussed above, lid housing 44 can be made in a manner similar to that of base housing 24 or can be made in multiple parts that can be assembled together in a desired order to enclose a display assembly 60 and any additional components therein. The assembly thereof can also be done in a desired manner to attach hinge lid portion 64 therewith, and can depend on the particular configuration of lid 14. In an example using injection molding of a single piece housing in a manner similar to that of bas3 housing 24, lid housing 44 can be made by injecting molten plastic into a mold including two outer portion surrounding a core that extends in a direction away from what will become open end 56. Such a mold can also be structured to form display opening 58 within a bezel wall. Display assembly 60 can then be assembled with such a single-piece lid housing resulting in lid assembly that can then be assembled with hinge assembly 18 by attaching hinge lid portion 64 to open end 56 of lid housing 44, which can be done in a similar manner to the attachment of hinge base portion 62 with open end 36 of base housing 24. Any wires that require connection between a display assembly and hinge assembly 18 can be connected prior to the attachment of hinge lid portion 64 lid assembly 14. It is noted that base assembly 12, lid assembly 14, and hinge assembly 18 can be conducted in parallel or in any sequence desired before assembly together. Further, lid assembly 14 can be assembled with hinge 18 before assembly with base 12, if desired. Additional finishing steps can also be carried out after the computer has been assembled, including cleaning, painting, polishing, packaging, battery charging, etc. (step 524 in FIG. 22).

Housings of a similar configuration to those described above in the context of a notebook computer can be used in other electronic devices as well. For example, a similar configuration of two assemblies including single-piece housings of the general form discussed above and connected with a hinge that covers open ends of the housings can be implemented in mobile telephones. In other examples, a single assembly having a single housing of the type discussed above with a cover over an open end thereof that helps maintain various positions of internal components of the device can be used in smartphones, tablet computers, e-readers or the like. Further, such housing configurations can be implemented in peripheral electronic devices, including keyboards and the like.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An electronic device, comprising:
a base housing of a single piece of material, the base housing having a length, a width, a height that is less than both the length and the width, the base housing including:
a plurality of walls defining an internal cavity, the plurality of walls including a front wall that spans the width and the height of the base housing and a lower wall that spans the length and the width of the base housing,
an open end located opposite the front wall, and
at least one structural support on the internal cavity of the base housing, the at least one structural support being integral with and extending from at least one of the plurality of walls thereof;
a hinge assembly that has a base portion removably affixed over the open end, with the base portion of the hinge assembly coupling to the lower wall; and
a plurality of electronic components contained within the internal cavity of the base housing in a specified position, at least one electronic component of the plurality of electronic components being supported in the specified position by the at least one structural support; and
wherein the at least one electronic component includes a trackpad assembly that has a substrate and a support structure that extends outwardly from the substrate, the support structure having a pair of opposing sides, wherein the support structure is contacted on a first side of the pair of opposing sides by at least one of another electronic component of the plurality of electronic components and on a second side of the pair of opposing sides by one of the plurality of walls.

2. The device of claim 1, wherein:
the base housing is a base assembly of a portable computer, and
the electronic device further includes a lid assembly operatively connected to the hinge assembly.

3. The device of claim 2, wherein the plurality of walls further includes an upper wall that spans the length and the width of the base housing, and
wherein the hinge assembly partially defines portions of the lower wall and the upper wall.

4. The device of claim 1, wherein the at least one structural support includes a boss in the interior cavity integrally formed with the base housing and extends from one of the plurality of walls; and
wherein the at least one electronic component includes a slot configured to receive the boss therein such that the boss supports the electronic component.

5. The device of claim 4, wherein the at least one electronic component includes a board assembly, the board assembly being removably received in the base housing where the boss engages with the slot of the board assembly and where the board assembly contacts a second electronic component of the plurality of electronic components; and
wherein the engagement with the boss and the contact with the second electronic component supports the board assembly in a position in the base housing.

6. The device of claim 1, wherein the at least one electronic component includes a keyboard assembly that has a compressible ring disposed around an outer periphery thereof, the compressible ring configured for snap-fit arrangement with the base housing.

7. The device of claim 5, wherein a keyboard assembly is positioned above the board assembly, the keyboard being in contact with end units of the board assembly.

8. The device of claim 3, wherein the base portion of the hinge assembly has a second length and a second width that are shorter than the length and width of the base housing, respectively, and the base portion of the hinge assembly is flush with and coupling to the lower wall.

9. An electronic device, comprising:
a base housing of a single piece of material, the base housing having a first length, a first width, a first height that is less than both the length and the width, the base housing including:
a plurality of walls defining an internal cavity, the plurality of walls including a front wall that spans the width and the height of the base housing and a lower wall that spans the length and the width of the base housing,
an open end to the internal cavity located opposite the front wall, and
at least one structural support on the internal cavity of the base housing adjacent to at least one of the plurality of walls thereof, the at least one structural support including one or more wedge elements assembled within the internal cavity of the base housing adjacent to the lower wall;
a plurality of electronic components contained within the internal cavity of the base housing in contact with the one or more wedge elements that supports at least one electronic component of the plurality of electronic components in a specified position; and
a hinge assembly that has a base portion removably affixed over the open end and that provides support to the at least one electronic component in the specified location, with the base portion of the hinge assembly being a surface flush with and coupling to the lower wall, wherein the base portion has a second length and a second width shorter than the first length and the first width, respectively.

10. The device of claim 9, wherein:

the base housing is a base assembly of a portable computer, and the electronic device further includes a lid assembly operatively connected to the hinge assembly.

11. The device of claim 10, wherein the plurality of walls includes an upper wall that spans the length and the width of the base housing, and wherein the hinge assembly partially defines portions of the lower wall and a upper wall.

12. The device of claim 9, wherein the at least one structural support provides one or more points of attachment for the at least one electronic component.

13. The device of claim 9, wherein, in addition to the one or more wedge elements, the at least one structural support includes a boss in the interior cavity, and wherein the at least one electronic components includes a board assembly having a slot configured to engage with the boss when the board assembly is received in the base housing, and wherein the engagement with the boss supports the board assembly in a position in the base housing.

14. The device of claim 9, wherein the plurality of electronic components includes a battery;

wherein the battery is between and in contact with the front wall of the base housing and the board assembly; and wherein the board assembly is between and in contact with the battery and the hinge assembly.

15. The device of claim 9, wherein one of the at least one electronic component includes a trackpad assembly that has a substrate and a support structure that extends outwardly from the substrate, the support structure having a pair of opposing sides, wherein the support structure is contacted on a first side of the pair of opposing sides by at least one of another electronic component of the plurality of electronic components and on a second side of the pair of opposing sides by one of the plurality of walls.

16. The device of claim 9, wherein the one or more wedge elements include at least one inclined plane attached to the lower wall of the base housing and the at least one electronic component includes an electronic component having an inclined surface configured to contact the at least one inclined plane.

17. The device of claim 9, wherein, in addition to the one or more wedge elements, the at least one structural support further includes a frame assembled in the base housing.

18. The device of claim 1, wherein the single piece of material is a plastic material usable in an injection molding process.

19. The device of claim 9, wherein when the hinge assembly is affixed over the open end, the plurality of electronic components is in continuous contact between the hinge assembly and the front wall.

\* \* \* \* \*